United States Patent [19]

Ohshima et al.

[11] 4,449,180
[45] May 15, 1984

[54] SEQUENCE PROGRAM INPUTTING DEVICE

[75] Inventors: Yoshimitsu Ohshima, Tokyo; Norio Yokozawa, Fuchu; Masayoshi Ohzeki, Chiba, all of Japan

[73] Assignee: Hitachi, Ltd., Tokyo, Japan

[21] Appl. No.: 374,870

[22] Filed: May 4, 1982

Related U.S. Application Data

[63] Continuation of Ser. No. 138,654, Apr. 9, 1980, abandoned.

[30] Foreign Application Priority Data

Apr. 11, 1979 [JP] Japan .................................. 54-43065

[51] Int. Cl.³ ......................... G06F 15/46; G06F 9/00
[52] U.S. Cl. .................................... 364/147; 364/136; 364/521
[58] Field of Search ................ 364/200, 900, 136, 147

[56] References Cited

U.S. PATENT DOCUMENTS

| 3,686,639 | 8/1972 | Fletcher et al. | 364/200 |
| 3,964,026 | 6/1976 | Yamauchi et al. | 364/900 |
| 4,149,235 | 4/1979 | Froyd et al. | 364/147 |
| 4,200,914 | 4/1980 | Kintner | 364/900 |
| 4,217,658 | 8/1980 | Henry et al. | 364/900 |
| 4,227,247 | 10/1980 | Kintner | 364/900 |
| 4,244,034 | 1/1981 | Cherba | 364/900 |

OTHER PUBLICATIONS

Furuta et al., Computer Aided Design of Sequence Control Logic, National Technical Report vol. 24, No. 6, Dec. 1978, pp. 1057-1065.

Primary Examiner—Felix D. Gruber
Attorney, Agent, or Firm—Antonelli, Terry & Wands

[57] ABSTRACT

A sequence program inputting device in a programmable sequence controller includes a separate producing circuit for producing a ladder diagram to be displayed on a display screen and a separate converting circuit for converting the ladder diagram to a machine instruction sequence of the programmable sequence controller to enable independent operations of those circuits.

8 Claims, 104 Drawing Figures

FIG.4

| INSTRUCTION | CONTENTS | FIGURE SYMBOL |
|---|---|---|
| AND | LOGICAL AND CORRESPONDING TO "·" OF BOOLEAN EXPRESSION | —│ │— |
| NAND | LOGICAL NAND | —│/│— |
| OR | LOGICAL OR CORRESPONDING TO "+" OF BOOLEAN EXPRESSION | L |
| OUT | OUTPUTTING INSTRUCTION CORRESPONDING TO "=" OF BOOLEAN EXPRESSION | —O— |
| ( | SUSPENDING CURRENT STATUS, AND PROCESSING INNER PART BETWEEN "(" AND ")" PREFERENTIALLY | T |
| ) | COMPLETING THE INNER PART PROCESS BETWEEN "(" AND ")" AND RETURN TO SUSPENDED PROCESS | ⌐ |
| START | STARTING A SET OF SEQUENCE CONTROL INSTRUCTIONS | ├— |

FIG.5

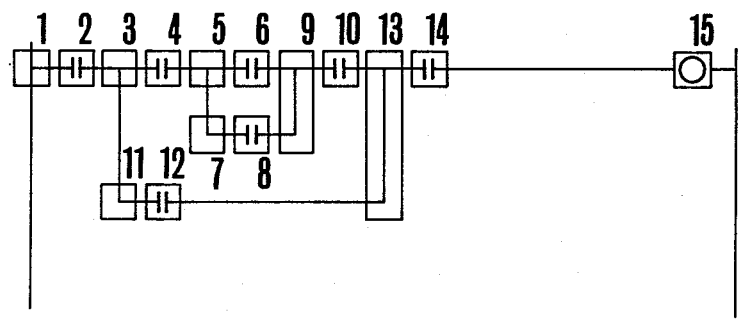

F I G. 9
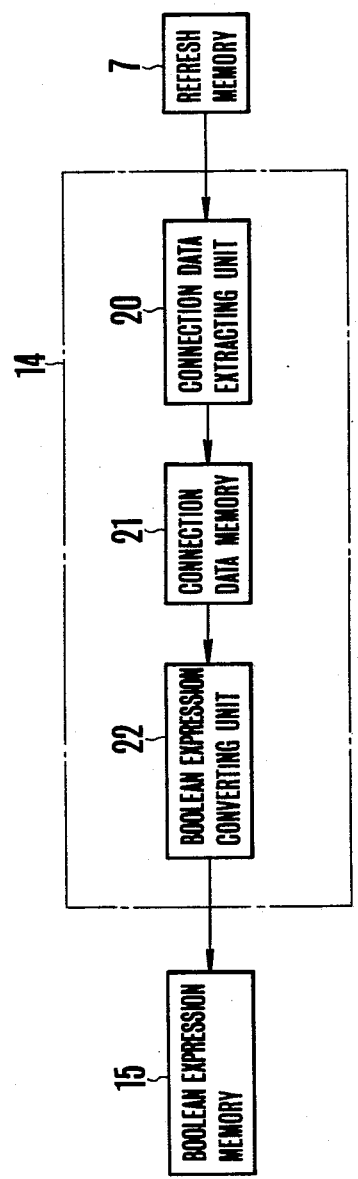

F I G.11
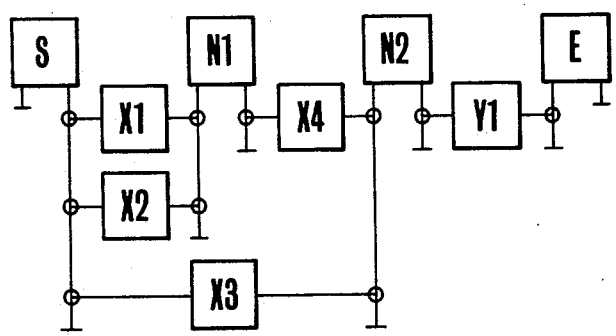
F I G.13
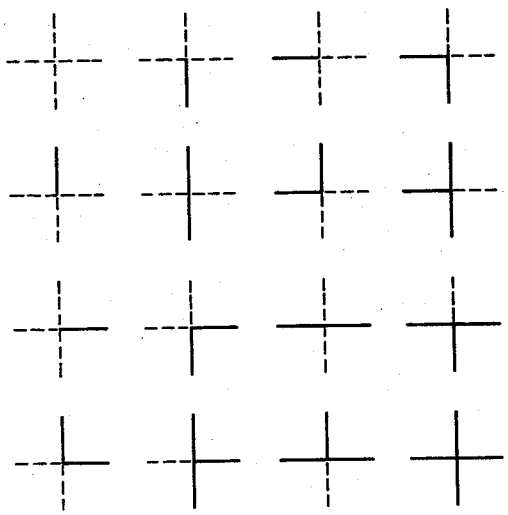

F I G.12
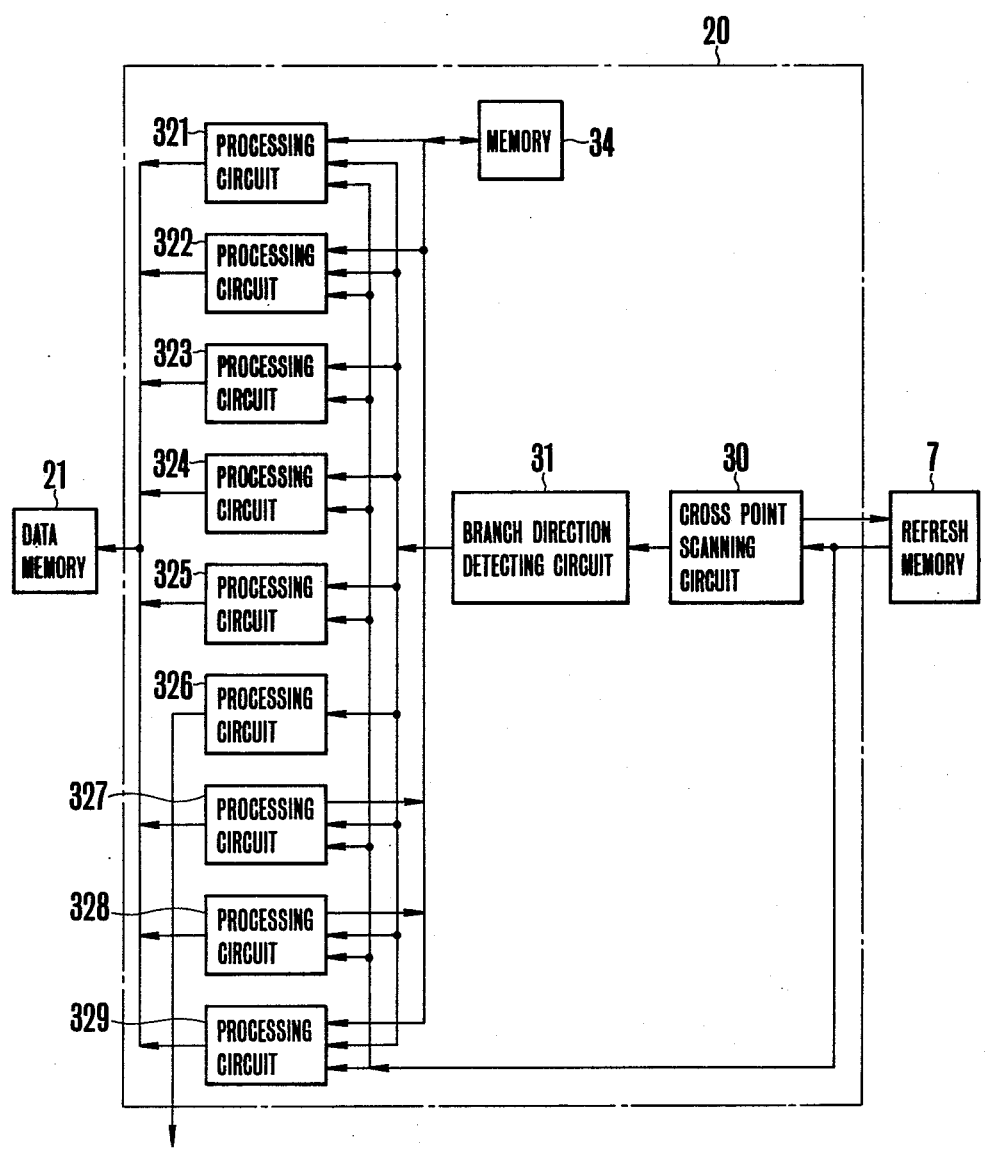

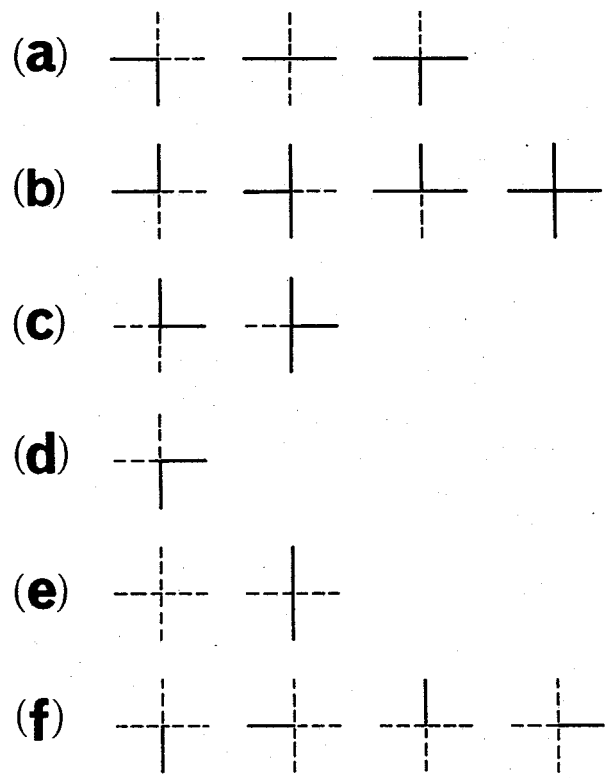

FIG. 19
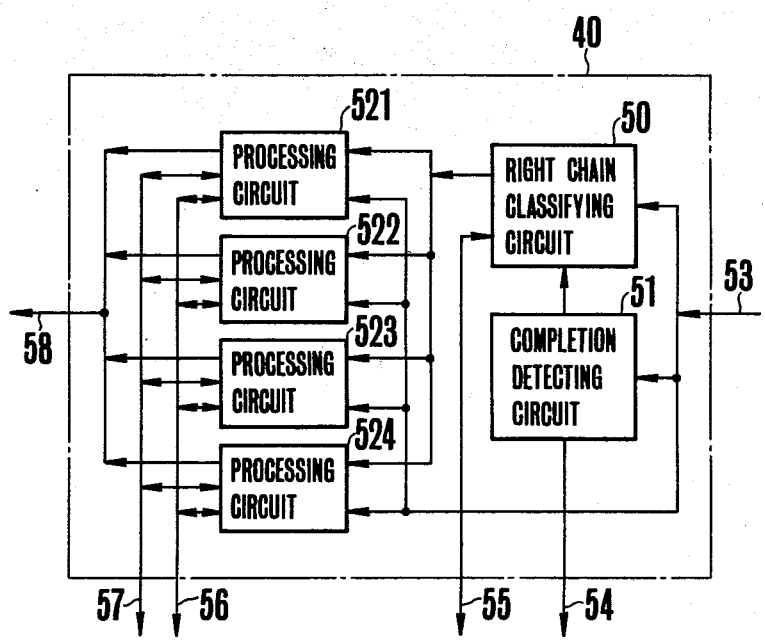
FIG. 20a  FIG. 20c
 FIG. 20b  FIG. 20d
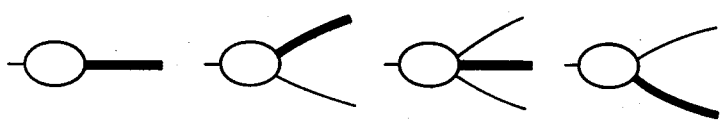

FIG.21
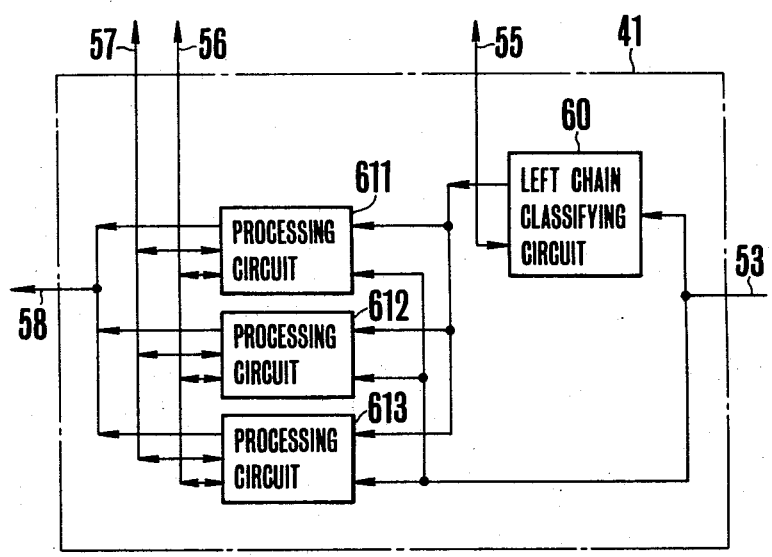
FIG.22a  FIG.22c
   FIG.22b    FIG.22d
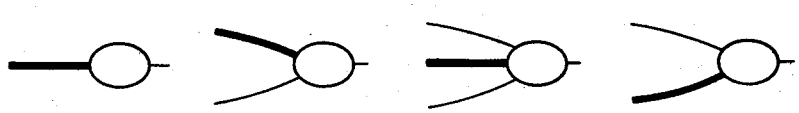
FIG.23a  FIG.23b
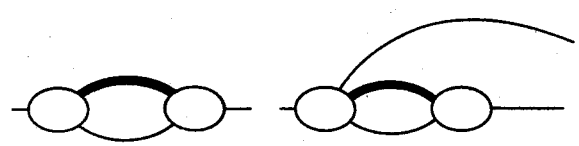

FIG.28
FIG.29
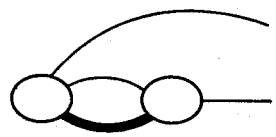
FIG.30a
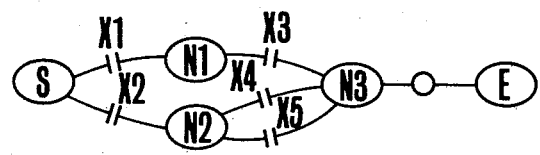
FIG.30c
$(X1 \cdot X3 + X2 \cdot (X4 + X5)) = Y1$

FIG.30b

| NO | NODE | BRANCH | PARTIAL BOOLEAN EXPRESSION | P$_B$ | STACK B | P$_A$ | STACK A (A1,A2,A3) |
|---|---|---|---|---|---|---|---|
| 0 | | | $ | 0 | | 0 | |
| 1 | S | X1 | X1 | 1 | $. | 1 | (S,0,0) |
| 2 | N1 | X1 | | | | | |
| 3 | N1 | X3 | X1·X3 | | | | |
| 4 | N3 | X3 | | 2 | X1·X3+,$. | 1 | (S,N3,0) |
| 5 | S | X2 | X2 | | | 1 | (S,N3,1) |
| 6 | N2 | X2 | | | | | |
| 7 | N2 | X4 | X4 | 3 | X2·,X1·X3+,$. | 2 | (N2,0,0) (S,N3,1) |
| 8 | N3 | X4 | | 4 | X4+,X2·,X1·X3+,$. | 2 | (N2,N3,0) (S,N3,1) |
| 9 | N2 | X5 | X5 | | | 2 | (N2,N3,1) (S,N3,1) |
| 10 | N3 | X5 | (X4+X5) | 3 | X2·,X1·X3+,$. | 1 | (S,N3,1) |
| 11 | | | X2·(X4+X5) | 2 | X1·X3+,$ | | |
| 12 | | | (X1·X3+X2·(X4+X5)) | 1 | $. | 0 | |
| 13 | | | $·(X1·X3+X2·(X4+X5)) | 0 | | | |
| 14 | N3 | Y1 | $·(X1·X3+X2·(X4+X5))=Y1 | | | | |
| 15 | E | Y1 | | | | | |

FIG. 33a
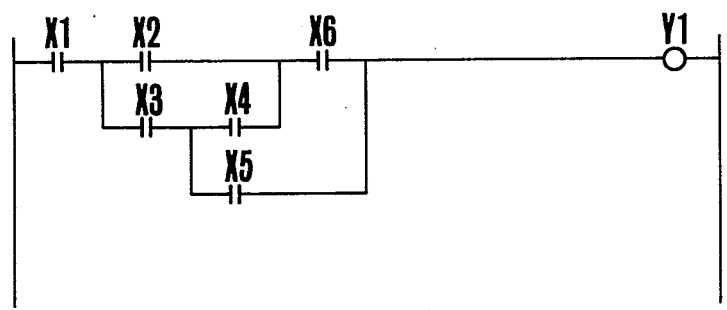
FIG. 33b
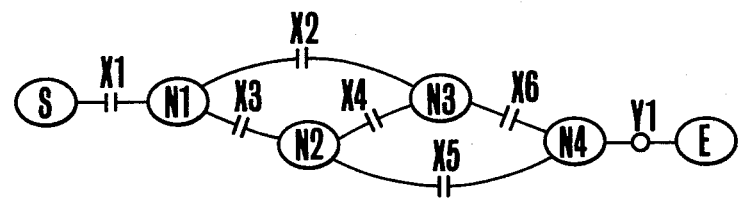
FIG. 33c
X1·(X2·X6+X3·X4·X6+X3·X5)=Y1
FIG. 35
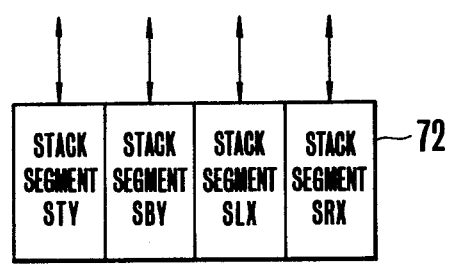

FIG.36a
$$A \cdot (/B + C \cdot (/D + E) \cdot F) = Y$$
FIG.36c
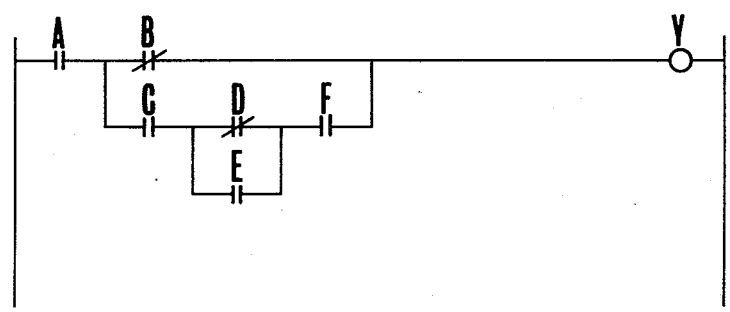
FIG.38a
$$A + B = Y$$
FIG.38b
$$(A + B) = Y$$
FIG.38c
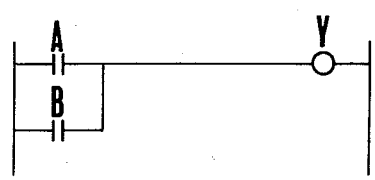

FIG.36b

| NO. | BOOLEAN EXPRESSION | GNP | Ps | STACK S (SLX,SRX,STY,SBY) | PT | STACK T | OUTPUT |
|---|---|---|---|---|---|---|---|
| 0 |  | (0,0) | 0 |  | 0 |  |  |
| 1 | A | (1,0) |  |  |  |  |  |
| 2 | · |  | 1 | (1,1,0,0) |  |  |  |
| 3 | /B | (2,0) |  |  | 1 | # | —∥— |
| 4 | + | (1,1) | 1 | (1,2,0,1) |  |  | —∦— |
| 5 | C | (2,1) |  |  | 2 | (2,0),# | —∥— |
| 6 | · ( |  | 2 | (2,2,1,1) | | | —∦— |
| 7 | /D | (3,1) |  | (1,2,0,1) | 3 | #,(2,0),# |  |
| 8 | + | (2,2) | 2 | (2,3,1,2) |  |  |  |
| 9 | E | (3,2) |  | (1,2,0,1) | 4 | (3,1),#,(2,0),# |  |
| 10 | ) | (3,1) | 1 | (1,2,0,2) |  |  | VERTICAL LINES OF BOTH TERMINALS |
| 11 | ·F | (4,1) |  |  | 2 | (2,0),# | —∥— |
| 12 | ) | (4,0) | 0 |  |  |  | VERTICAL LINES OF BOTH TERMINALS ETC. |
| 13 | =Y |  |  |  | 0 |  | —◯— |

FIG.37
(1) 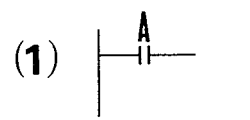
(3) 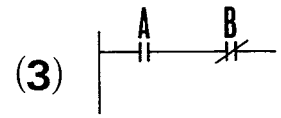
(5) 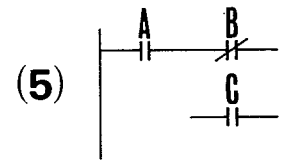
(7) 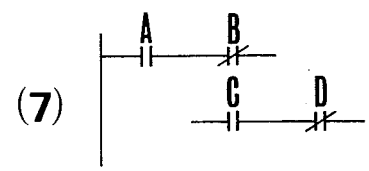
(9) 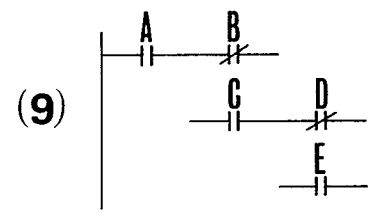
(10) 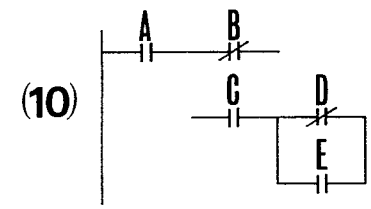
(11) 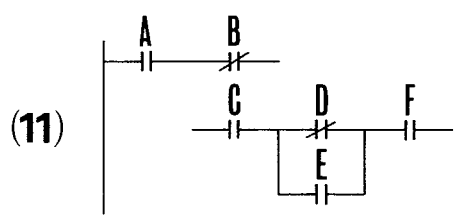
(12) 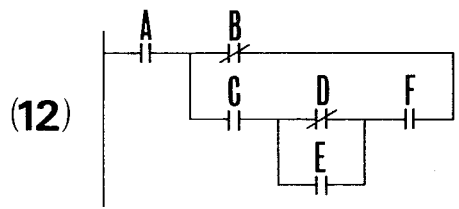

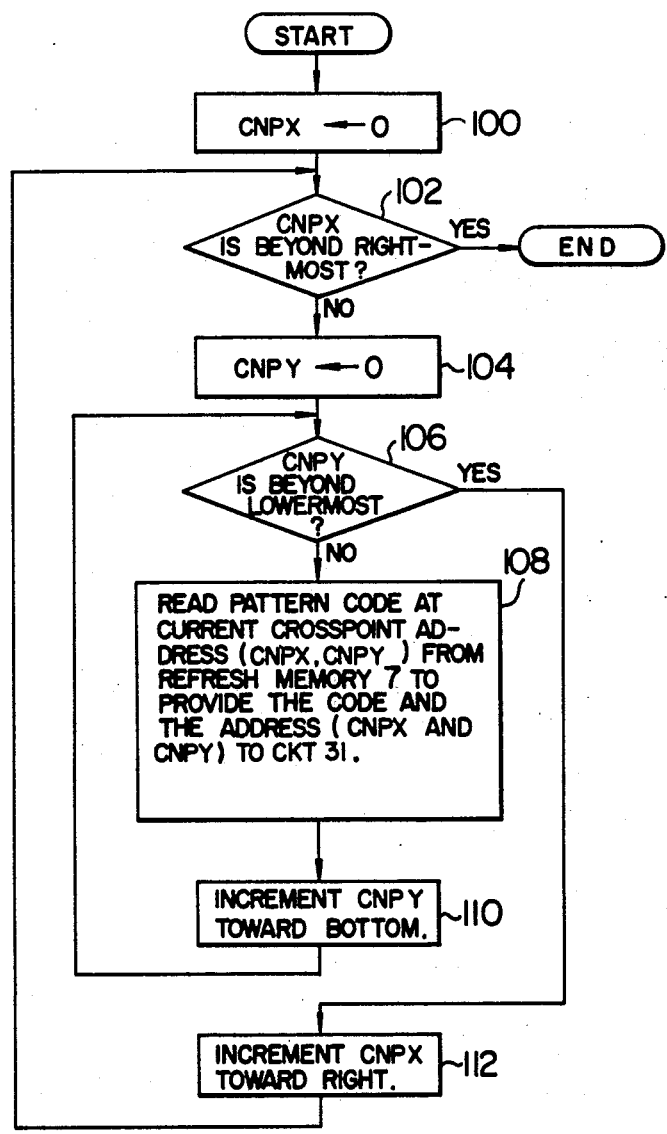

\<NOTES\>
X: A PARTIAL BOOLEAN EXPRESSION GENERATED SO FAR
Y: THE NAME OF CONTACT CORRESPONDING TO THE BRANCH CELL BEING PROCESSED

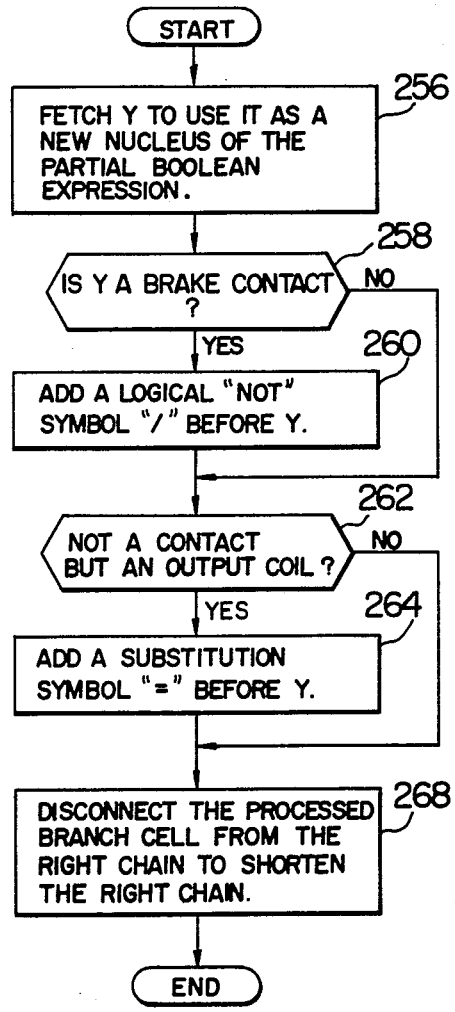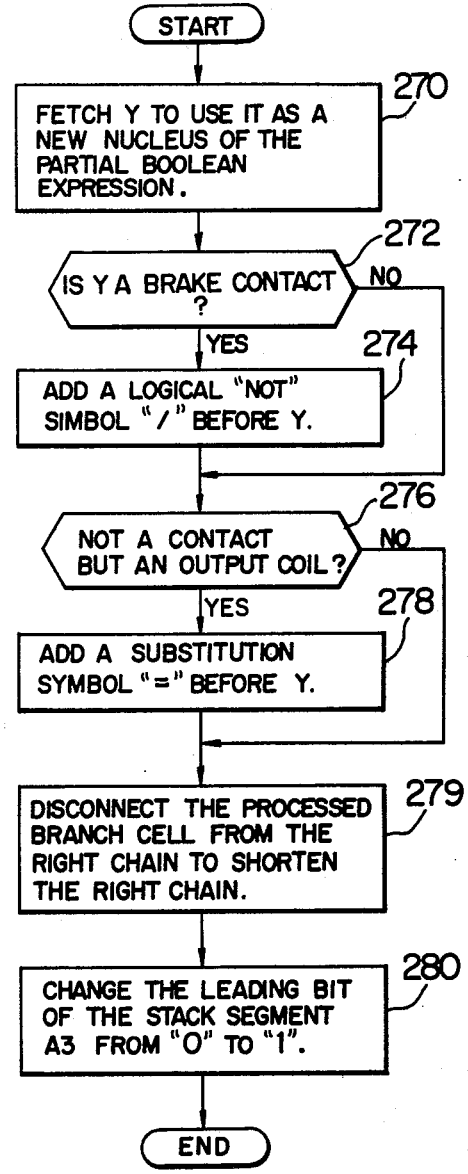
FIG. 54
FIG. 55
⟨ NOTES ⟩
X: A PARTIAL BOOLEAN EXPRESSION GENERATED SO FAR
Y: THE NAME OF CONTACT CORRESPONDING TO THE BRANCH CELL BEING PROCESSED

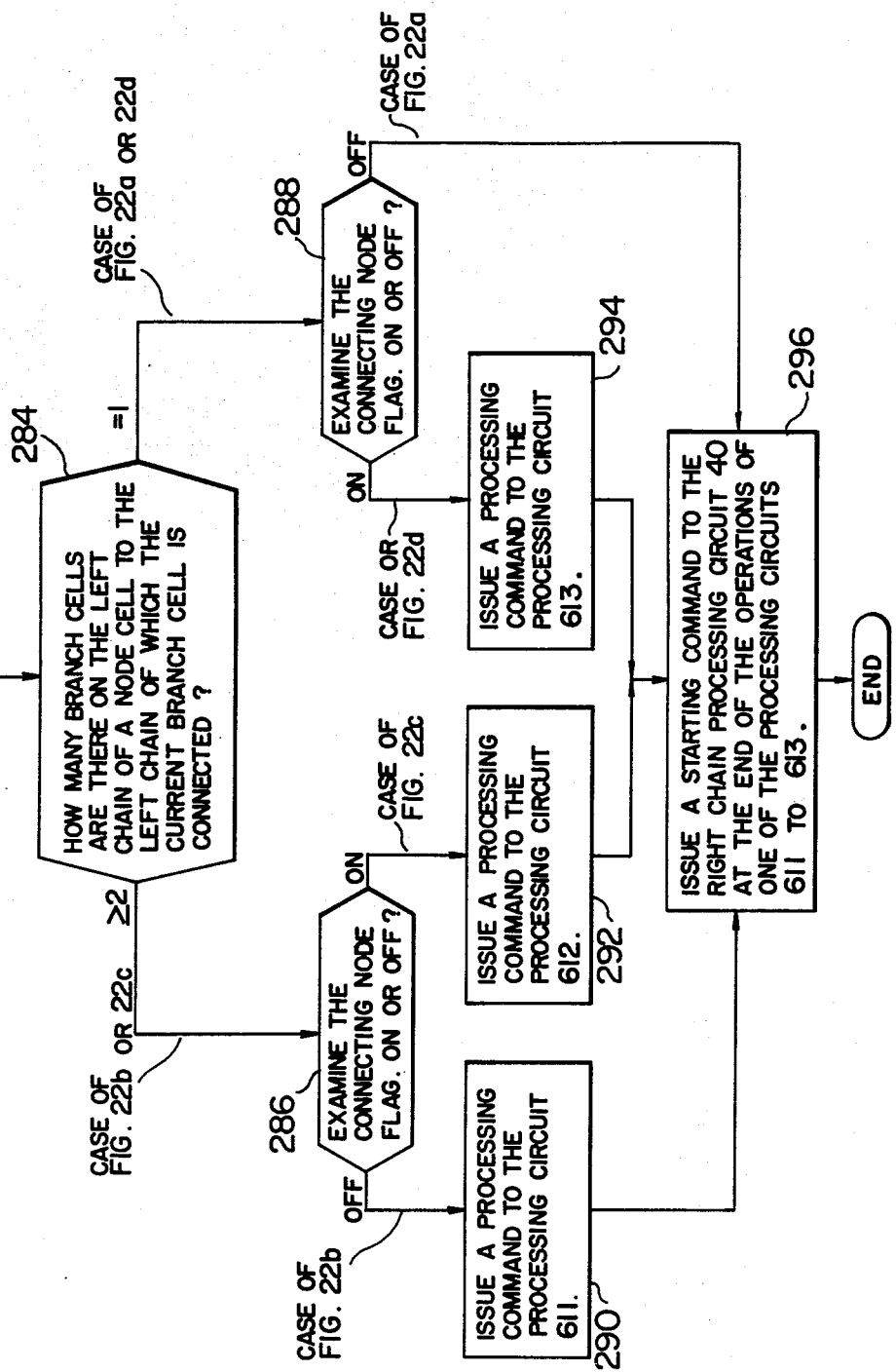

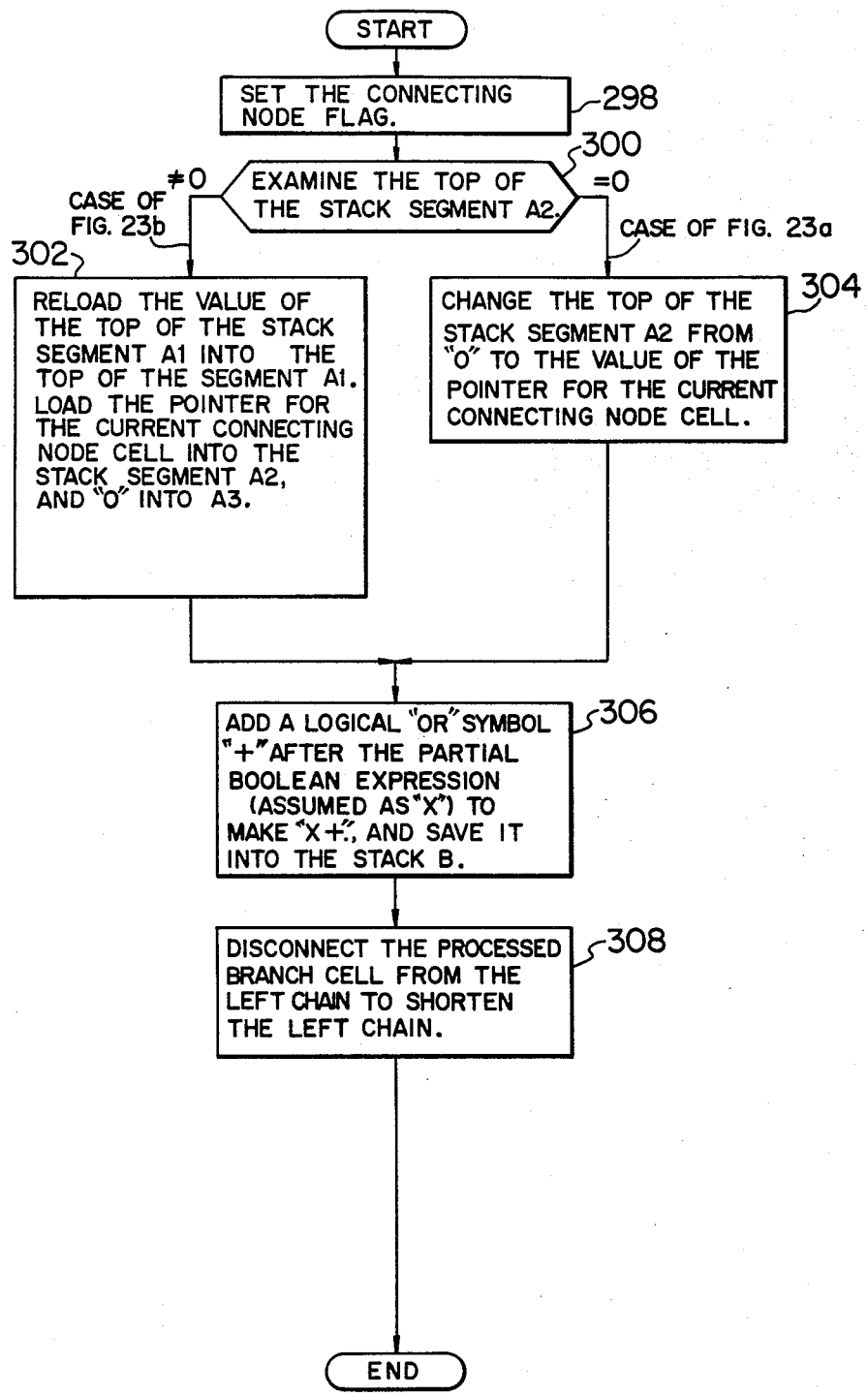

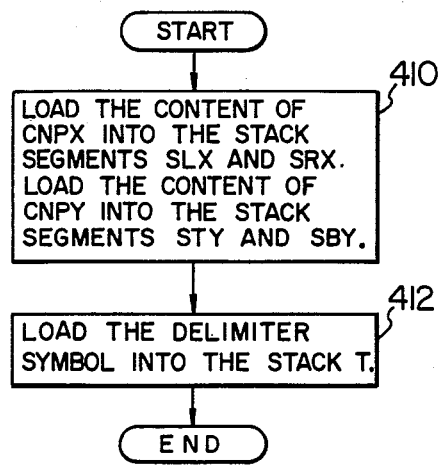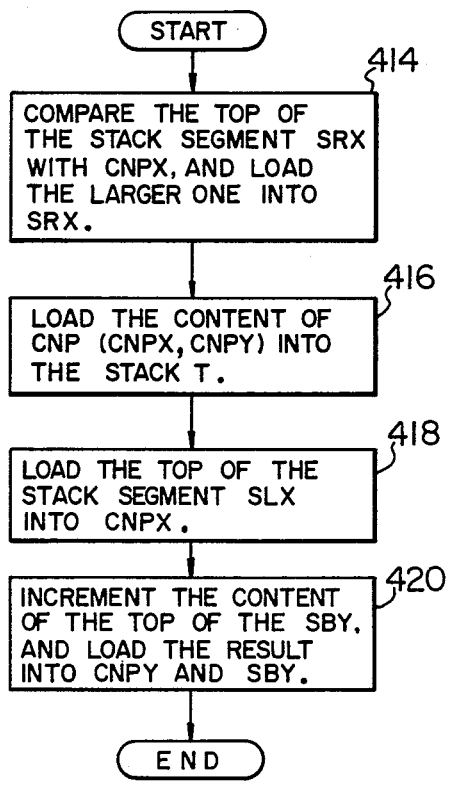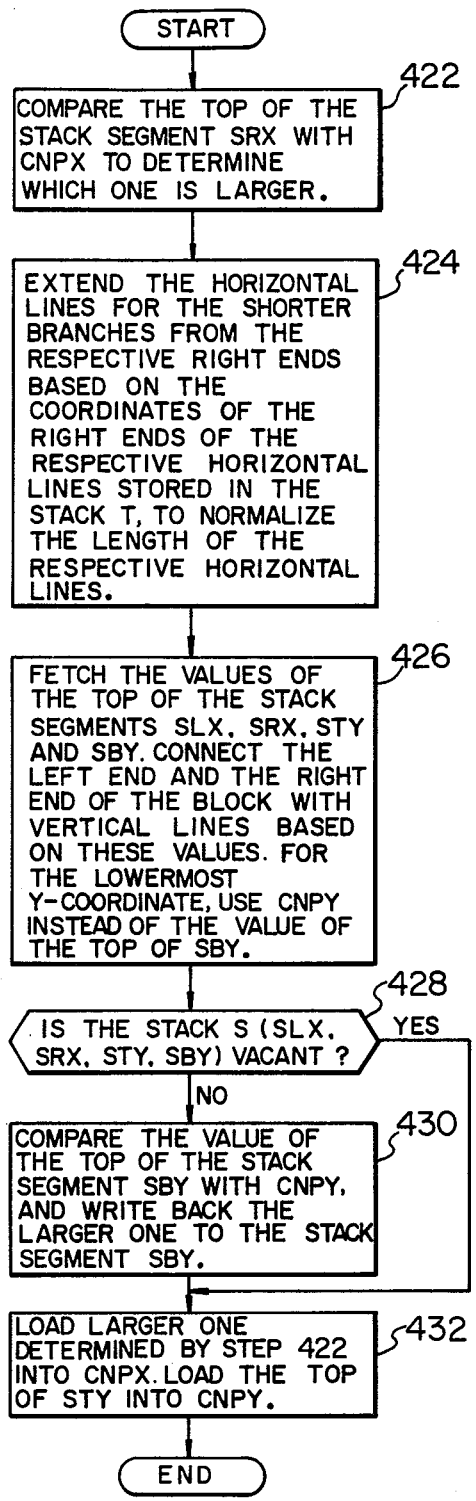

SEQUENCE PROGRAM INPUTTING DEVICE

This is a continuation of application Ser. No. 138,654 filed Apr. 9, 1980 and now abandoned.

BACKGROUND OF THE INVENTION

1. Field of the Invention

The present invention relates to a sequence program inputting device in a programmable sequence controller for producing, correcting and editing a sequence program.

2. Description of the Prior Art

The programmable sequence controller (hereinafter referred to as SC) attains functions similar to those of a relay circuit primarily used in a sequence control, using a stored program type general purpose electronic circuit similar to an electronic computer. FIG. 1 shows a configuration of the SC, in which numeral 1 denotes an arithmetic and control unit, numeral 2 denotes a storage unit, numeral 3 denotes an interface unit to a device to be sequence controlled, and numeral 4 denotes a sequence program inputting device from which an operator inputs a sequence program.

A relay ladder diagram as shown in FIG. 2 has been widely used in designing the sequence control. When a two-dimensional image display device such as a CRT display device is used, the ladder diagram can be directly displayed. Thus, by using the ladder diagram for the sequence program inputting device of the SC, those technicians who have been familiar with the ladder diagram will be able to easily input the sequence program when they handle the SC.

The sequence program inputting devices which utilize the two-dimensional image display devices such as CRT display devices have been known in the art. One example thereof is shown in FIG. 3, in which numeral 5 denotes a keyboard from which an operator keys in a sequence program and various operation commands, numeral 6 denotes a control unit for writing the sequence program inputted from the keyboard 5 into a refresh memory 7 and/or into the storage unit 2 of the SC, reading the sequence program from the storage unit 2 and writing it into the refresh memory 7, and executing various commands inputted from the keyboard 5. Numeral 7 denotes the refresh memory in which data to be displayed on a display unit 10 is stored. The data stored therein is sequentially read out at a timing clocked by a display control unit 9 and is converted to characters or figure elements of the ladder diagram by a pattern generator 8, which which the data is displayed on the display unit 10 under the control of the display control unit 9.

The SC usually includes a set of logical operation instructions for executing logical OR and logical AND functions in order to execute the sequence control. An example of a set of such instructions is shown in FIG. 4. In the sequence program inputting device of the construction described above, each of the figure symbols of the ladder diagram shown on the righthand of the chart of FIG. 4 is allocated to one of the logical operation instructions and keys (push buttons) marked with those figure symbols are provided on the keyboard of the program inputting device so that an operator can depress desired figure symbol keys to input the ladder diagram.

FIG. 5 shows an example of the relay sequence program (ladder diagram) inputted in accordance with the above sequence. In FIG. 5, the portions circled by squares correspond to the figure symbol keys on the keyboard of the inputting device. The numerals on the upper right corners of the squares indicate the sequence of the key operation. The figure symbols of the relay contacts or relay coils should be numbered or named, but they are omitted here for the convenience of explanation.

As described above, the figure symbols on the keys have one-to-one correspondence with the instructions of the SC. In this system, each time a figure symbol key is depressed, a corresponding instruction is written into the refresh memory 7 and displayed on the display unit 10, and it is simultaneously written into the storage unit 2 of the SC. Accordingly, in this system, the sequence of key operation is an important factor in inputting and/or correcting the sequence program. In other words, if the keys are depressed in a different sequence, a different ladder diagram will be produced or a ladder diagram which cannot operate correctly will be produced.

Accordingly, in this system, the CRT display device is used in inputting the ladder diagram so that those technicians who have been familiar with the ladder diagram can conveniently handle the SC, but, in actual fact, it inputs the sequence program in the form of one-dimensional image and does not fully and effectively utilize the two-dimensional image. The operator, when inputting the sequence program, must previously draw the ladder diagram on a design sheet and determine the sequence of key operation before he actually inputs the sequence program.

SUMMARY OF THE INVENTION

It is an object of the present invention to provide a sequence program inputting device which is not restricted by the sequence of key operation and which makes it possible to input the ladder diagram, which is essentially a two-dimensional pattern, with a fully two-dimensional operation sequence using a two-dimensional image.

In order to attain the above object, in accordance with the present invention, means for producing the ladder diagram on a display screen and means for converting the ladder diagram to a machine instruction sequence of the SC are separated so that they can operate independently. Thus, while the producing means is receiving or correcting the sequence program, only the ladder diagram is displayed on the display screen, and after the ladder diagram has been produced it is converted to the machine instruction sequence by the converting means of the SC. As a result, since the ladder diagram has no direct correspondence to the machine instructions of the SC, the operator can use the operation keys which are easy to operate for him, for producing the ladder diagram.

BRIEF DESCRIPTION OF THE DRAWINGS

FIG. 4 shows an example of an instruction set;

FIG. 5 shows a ladder diagram of a sequence program to be inputted in a predetermined sequence;

FIGS. 6 to 38 show embodiments of the sequence program inputting device in accordance with the present invention, in which;

FIG. 7 shows a ladder diagram produced;

FIG. 8 shows a block diagram of one embodiment of the sequence program inputting device;

FIG. 9 shows a block diagram of one embodiment of the ladder diagram converting unit shown in FIG. 8;

FIG. 12 shows a block diagram of one embodiment of the connection data extracting unit shown in FIG. 9;

FIGS. 13, 14a–f, 15a–c, 16a–d illustrate the operation of the connection data extracting unit shown in FIG. 12;

FIG. 17 shows a block diagram of one embodiment of the Boolean expression converting unit shown in FIG. 9;

FIG. 18 shows a construction of one embodiment of the data memory shown in FIG. 17;

FIG. 19 shows a block diagram of one embodiment of the right chain processing circuit shown in FIG. 17;

FIG. 20a–d illustrates the operation of the circuit of FIG. 19;

FIG. 21 shows a blockdiagram of one embodiment of the left chain processing circuit shown in FIG. 17;

FIGS. 22a–d, 23a, b, 24a–d, 25, 26, 27a–c, 28 illustrate the operation of the circuit shown in FIG. 21;

FIG. 29, 30a–c, 31 to FIGS. 33a-33c illustrate the operation of the Boolean expression converting unit shown in FIG. 17;

FIG. 34 shows a block diagram of one embodiment of the ladder sequence reproducing circuit shown in FIG. 8;

FIG. 35 shows a construction of one embodiment of the memory shown in FIG. 34;

FIGS. 36a–c, to 38a–c illustrate the operation of the Boolean expression reproducing unit shown in FIG. 34;

FIG. 39 is a flow chart relating to the operation of the crosspoint scanning circuit 30 in FIG. 12;

FIGS. 52 through 55 are flow charts illustrating the operations of the processing circuits 521 through 524, respectively, of FIG. 19;

FIG. 56 is a flow chart illustrating the operation of the left chain classifying circuit 60 of FIG. 21;

FIGS. 57, 58A and 58B, and 59A through 59D, are flow charts illustrating the operation of the processing circuits 611, 612 and 613 of FIG. 21;

FIGS. 61 through 66 are flow charts illustrating the operation of the processing circuits 711 through 716, respectively, of FIG. 34.

DETAILED DESCRIPTION OF THE PREFERRED EMBODIMENTS

Figure 1:
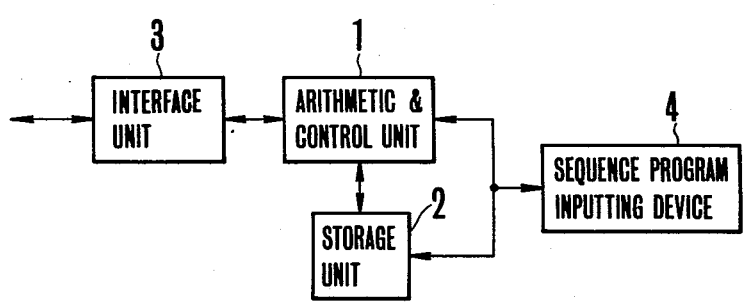
FIG. 1 is a block diagram showing a general construction of a programmable sequence controller (SC)
Figure 2:
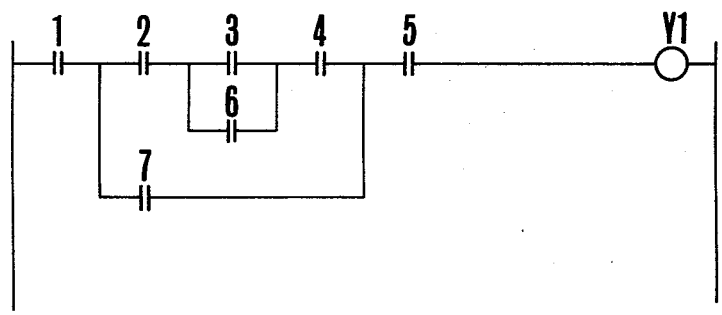
FIG. 2 shows a ladder diagram.

A preferred embodiment of the present invention in the form of discrete system will be described to provide a clear understanding of the features of the present invention; however, it should be apparent from this description that the present invention may also be implemented using a central computer with programs for carrying out the functions described and shown in the flow sheets provided in the drawings. Thus, in this description of the invention, the term "processing circuit" is not restricted to actual circuits or components of a circuit, but may also represent a sub-routine of a program where the invention is implemented through use of a general purpose computer.

Figure 6A:
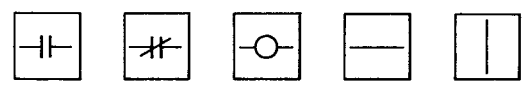
FIG. 6a, b show an example of construction of operation keys.
Figure 6B:
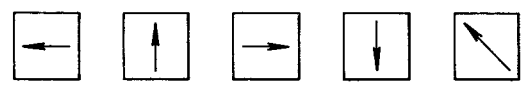

FIGS. 6a and 6b show examples of the operation keys of the sequence program inputting device, illustrating a principle of the sequence program inputting device of the present invention. FIG. 6a shows symbol inputting keys for inputting figure symbols and FIG. 6b shows cursor control keys for instructing the movement of a cursor (a special mark displayed on the display screen) for specifying an inputting position. Unlike the prior art device described above, the figure symbol keys shown in FIG. 6a have no direct correspondence to the machine instructions of the SC.

As described above, in the present invention, the production of the ladder diagram is not bound by the machine instruction sequence of the SC. Accordingly, the inputting sequence of the figure symbols may be arbitrary and even if the sequence of operating the symbol inputting keys changes from one to the other, the machine instruction sequence of the SC which is provided by converting the ladder diagram is not affected. Instead, it is necessary to specify the inputting position on the display screen by the cursor control keys. However, by providing a function for automatically moving the cursor to a next adjacent position each time a symbol inputting key is operated as is the case in a conventional character display device, the number of times of depressing the cursor keys is decreased. In place of the cursor control keys, a light pen or a joy stick (control stick) may be used to specify the inputting position.

Figure 7:
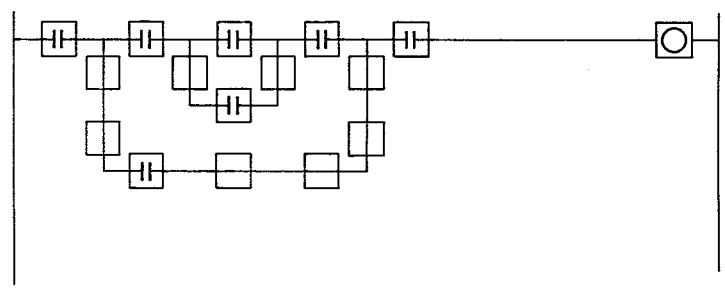

FIG. 7 shows an example of the ladder diagram similar to that shown in FIG. 5, produced using the symbol inputting keys and the cursor control keys of FIGS. 6a and 6b. In FIG. 7, those portions circled by squares correspond to the figure symbol keys. Like in FIG. 5, the numbers or names of the contacts and the output coils are omitted for the convenience of explanation. As explained above, in this example, the sequence of operation of the symbol inputting keys is completely arbitrary. Accordingly, no number is shown to indicate the sequence of operation.

In this manner, a desired ladder diagram can be readily produced, but in the present invention the machine instructions of the SC are not simultaneously generated. Accordingly, a converting unit for converting the ladder diagram to the machine instruction sequence of the SC is needed.

The present invention will be explained in more detail with reference to the preferred embodiments.

Figure 3:
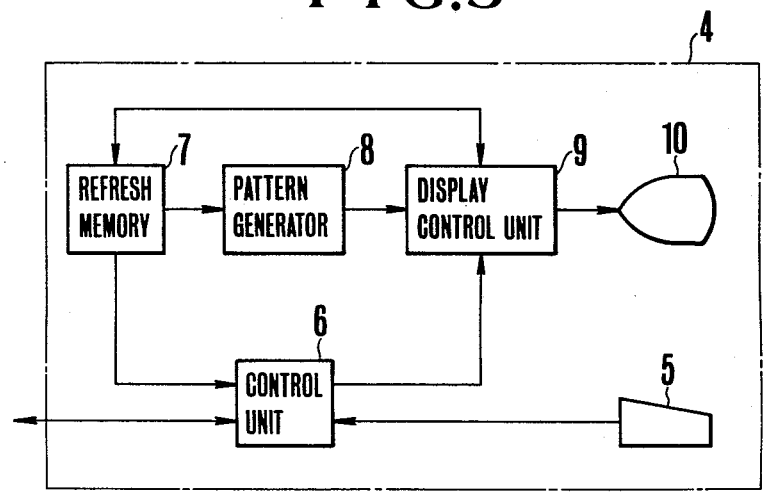
FIG. 3 shows a block diagram of a prior art sequence program inputting device.
Figure 8:
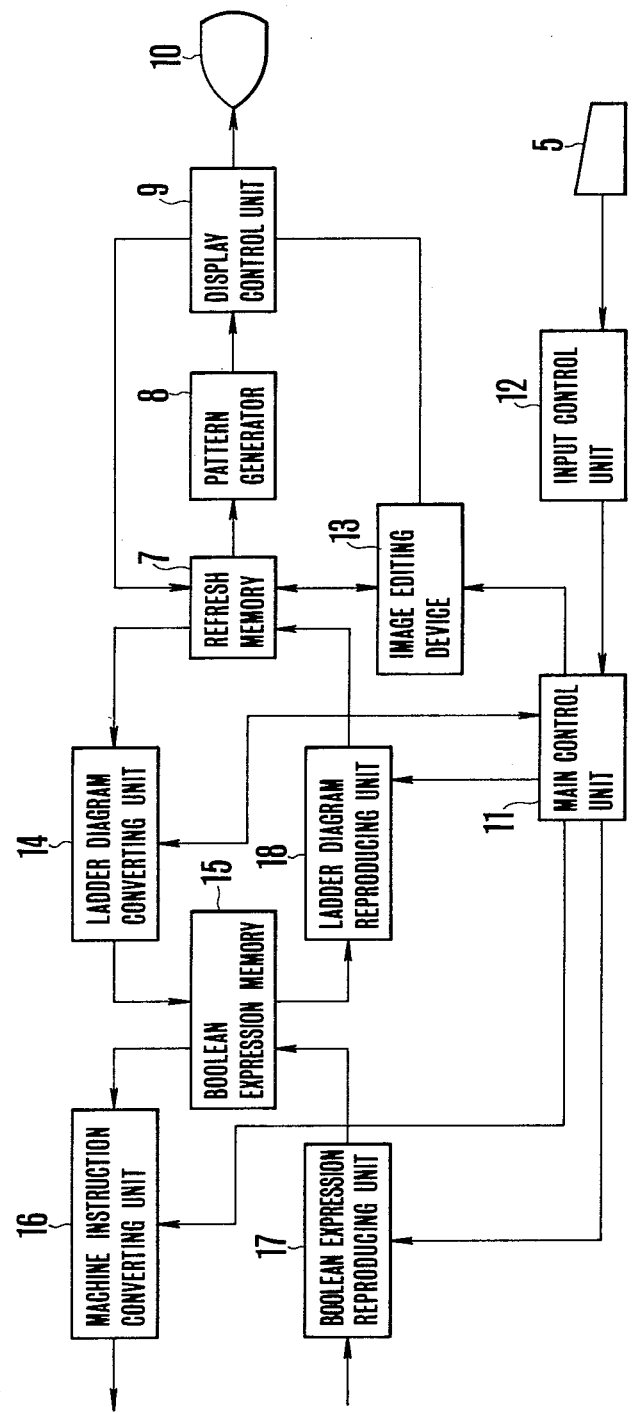

FIG. 8 shows a configuration of one embodiment of the sequence program inputting device in accordance with the present invention. It shows the configuration of the sequence program inputting device 4 shown in FIG. 1. Numerals 7, 8, 9, 10 and 5 denote the refresh memory, pattern generator, display control unit, display unit and keyboard, respectively, as is the case of FIG. 3. Like in FIG. 3, display information of the ladder diagram to be displayed is stored in the refresh memory 7 in the form of coded data. This information is sequentially read out under the control of the display control unit 9 and converted to characters or figure patterns by the pattern generator 8 for displaying on the display unit 10.

Numeral 11 denotes a main control unit. It controls the operation of the sequence program inputting device, so as to decode various processing commands inputted from the keyboard 5 through an input control unit 12 and apply the actual processing commands to various processing units to be described below. Numeral 13 denotes an image editing device for the ladder diagram. It carries out edit operations such as production and/or correction of the ladder diagram in response to image editing commands inputted from the keyboard 5.

The units described above can be readily implemented by the currently available logic circuit elements.

Numeral 14 denotes a ladder diagram converting unit. It responds to the display information of the ladder diagram stored in the refresh memory 7 to convert it into a Boolean expression and write it into a Boolean expression memory 15. Numeral 16 denotes a machine instruction converting unit for converting the generated Boolean expression stored in the Boolean expression memory 15 to machine instruction words of the SC. The ladder diagram produced in the refresh memory 7 is converted to the sequence program in the form of the machine instruction sequence of the SC by the ladder diagram converter 14 and the machine instruction converting unit 16 and then it is written into the storage unit (2 in FIG. 1) of the SC.

Numeral 17 denotes a Boolean expression reproducing unit for reconverting the machine instruction sequence in the storage unit of the SC to the Boolean expression. Numeral 18 denotes a ladder diagram reproducing unit for reproducing the ladder diagram from the Boolean expression. The sequence program in the storage unit of the SC is restored to the ladder diagram by the units 17 and 18 and written into the refresh memory 7 for displaying on the display unit 10. This inverse conversion mechanism is necessary when a correction is to be subsequently made for the sequence program which has been previously produced and stored in the storage unit 2 of the SC. By the provision of this mechanism, the correction of the inputted sequence program can be allowed in the form of the ladder diagram.

In the present embodiment, both the conversion from the ladder diagram to the machine instruction sequence of the SC and the inverse conversion use the step of Boolean expression conversion. Alternatively, it is possible to omit the Boolean expression conversion step and convert the ladder diagram directly to the machine instruction sequence of the SC or vice versa. It will be readily understood that the number of circuit elements can be reduced by this arrangement. (at least the Boolean expression memory 15 can be omitted.) On the other hand, the configuration of FIG. 8 has the following advantage.

The units 14 and 18 are in charge of mutual conversion between the ladder diagram and the Boolean expression. The units 16 and 17 which play a role of mutual conversion between the machine instruction and the Boolean expression are in charge of interface for the SC. By replacing them, the device can be connected to any type of SC.

The machine instruction converting unit 16 can be readily constructed by using a compiler method of a high level programming language (e.g. FORTRAN) of an electronic computer. Similarly, the Boolean expression reproducing unit 17 can also be readily constructed in the same way. Those units 16 and 17 may be construced independently or in common by a programmed processing unit such as a microcomputer.

The units 14 and 18 will now be explained in more detail in sequence.

The ladder diagram converting unit 14 may comprise three sections as shown in FIG. 9, in which numeral 20 denotes a connection data extracting unit, 21 denotes a connection data memory and 22 denotes a Boolean expression converting unit.

The connection data extracting unit 20 extracts logical connection data indicative of the connection of the contacts and/or output coils in the ladder diagram from coded information (pattern codes) of the figure patterns in the refresh memory 7, to provide data relating thereto to the connection data memory 21. The Boolean expression converting unit 22 responds to the logical connection data of the ladder diagram presented to the connection data memory 21 for producing the corresponding Boolean expression and forwards this data for storage in the Boolean expression memory 15. The connection data extracting unit 20, prior to the conversion to the Boolean expression by the converting unit 22, serves to eliminate redundant portions of the ladder diagram (e.g. mere vertical or horizontal lines merely serving to connect the crosspoints) in the refresh memory (or on the CRT screen). It simultaneously plays a role of converting the logical connection data to enable the simplification of the construction of the Boolean expression converting unit 22.

The following two assumptions have been made in the present embodiment on the ladder diagram which is the input to the ladder diagram converting unit 14 and hence to the connection data extracting unit 20;

(1) The contacts and the output coils have diode functions. That is, current always flows from the left to the right through each contact and each output coil horizontally displayed on the display screen. Thus, the left end of the pattern is an inlet for a current and the right end is an outlet. A power supply bus is present at the leftmost end of the screen and a ground line is present at the rightmost end of the screen. (See FIG. 7)

(2) Each horizontal or vertical line having no contact merely serves to connect the opposite ends thereof with equipotential. Unlike the case (1), the direction of current is not defined in this case, that is, the current can flow in either direction.

Figure 10A:
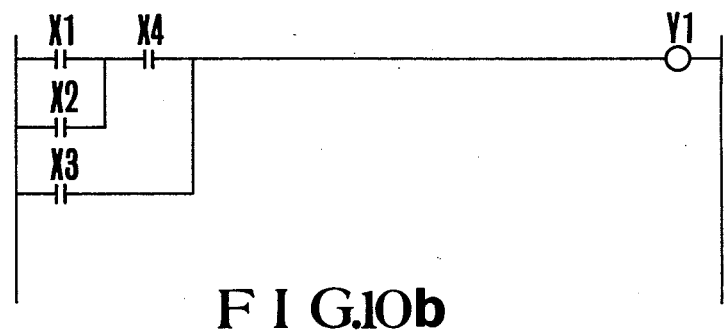
FIGS. 10a, b, c and 11 illustrate the operation of the converting unit shown in FIG. 9.
Figure 10B:
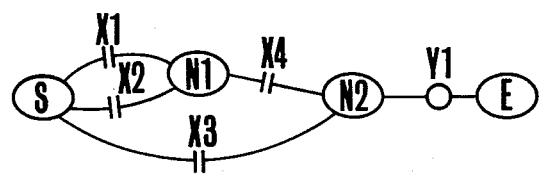
Figure 10C:
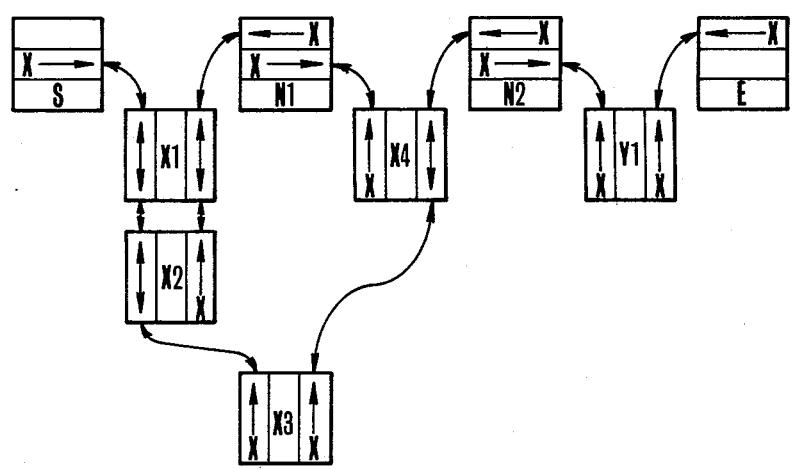

FIGS. 10a to 10c show the data structure of the connection data obtained from the processing by the connection data extracting unit 20. FIG. 10a shows a ladder diagram on the display screen, which is the subject of conversion, FIG. 10b shows a diagram of the topological connection extracted from the diagram of FIG. 10a while eliminating redundant portions (e.g. mere horizontal and vertical lines), and FIG. 10c shows the mutual relation of the data of FIG. 10b developed in the connection data memory 21. It is a list structure using pointers (addresses).

As is seen from FIG. 10c, it comprises two types of data elements, one being a "node" cell (which corresponds to S, N1, N2, E in FIGS. 10b and 10c) and the other being a "branch" cell (which corresponds to X1–X4 and Y1 in FIGS. 10b and 10c).

The node cells represent the points which are merely interconnected by the horizontal and/or vertical lines and hence which are equipotential. The branch cells represent the contacts and the output coils. Two types of "chains" extend from each of the node cells to interconnect the node cell and the branch cell. These are called "right chain" and "left chain". The right chain is connected to the associated node cell and connects the branch cell downstream of that node cell. The left chain is also connected to that node cell and connects the branch cell upstream of that node cell. Usually, the branch cell which is next to the right of the node cell on the display screen is connected to the right chain while the branch cell next to the left of the node cell is connected to the left chain. The terms left and right for the chains indicate the directions when viewed from the node cells, and they are reversed when viewed from the branch cells. FIG. 11 diagramatically shows the presence of the left chains and the right chains. In FIG. 11, those squares each having two downwardly extending legs represent the node cells and the left one of the two legs is the left chain while the right leg is the right chain. Those squares each having arms extending in the opposite directions connected to the left chain and the right chain of the respective node cells represent the branch cells.

By determining the connection sequence to the chains such that the further up in the CRT screen the right chains or the left chains are positioned the closer they are connected to the node cells, the relative positional relationship of the ladder diagram on the connection data can be retained.

Figure 40:
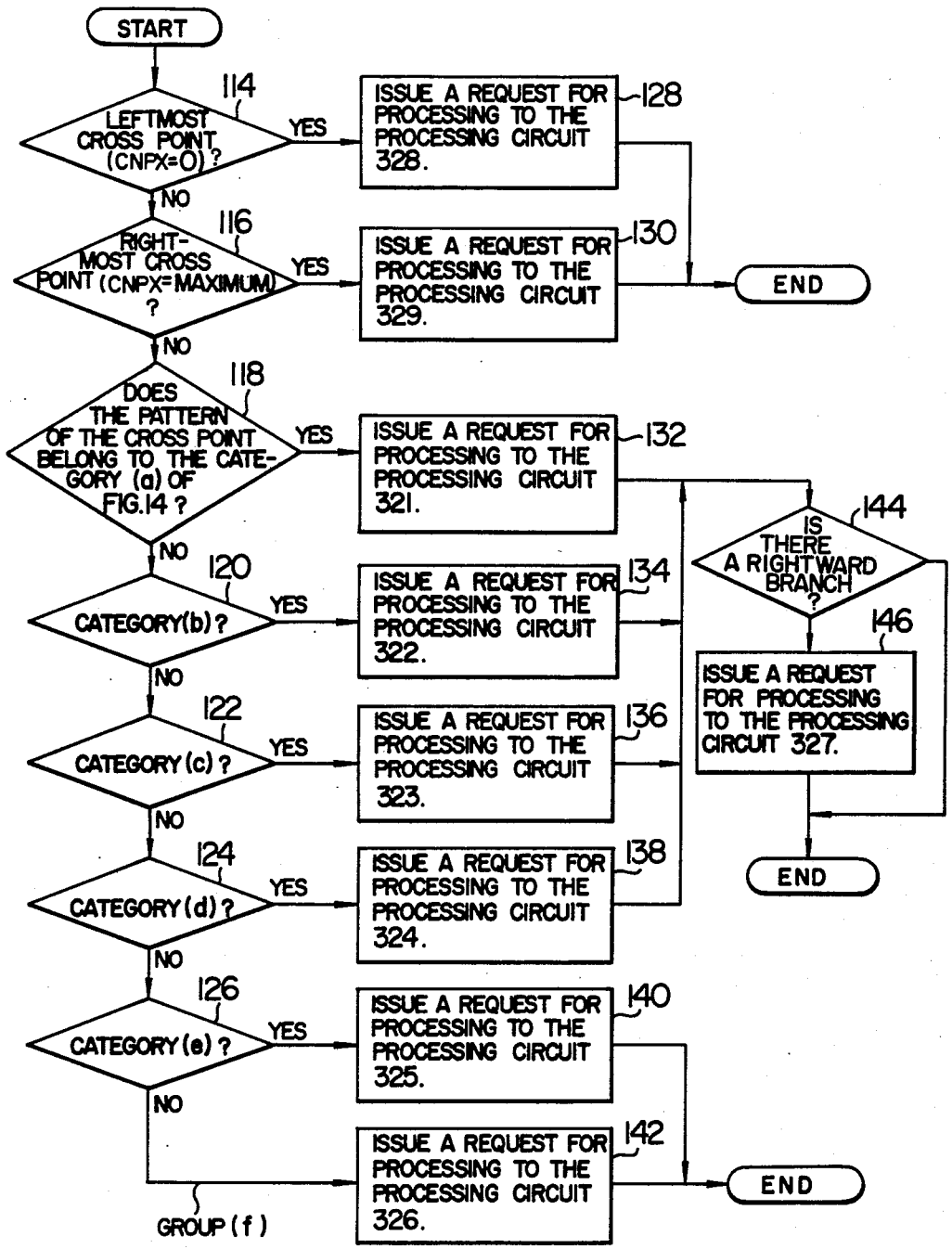
FIG. 40 is a flow chart illustrating the operation of the branch direction detecting circuit 31 in FIG. 12.

FIG. 12 shows a configuration of an embodiment of the connection data extracting unit 20. Numeral 30 denotes a crosspoint scanning circuit of the ladder diagram, 31 denotes a branch direction detecting circuit, 321 to 329 denote processing circuits for the connection data and 34 denotes a memory. The crosspoint scanning circuit 30 sequentially scans the crosspoints (of the connecting lines) of the ladder diagram stored in the refresh memory 7 (FIG. 39, steps 100 to 112) and provides a scanned pattern code and addresses CNPX and CNPY of the scanned crosspoints. The branch direction detecting circuit 31 detects and analyzes the connection condition at each crosspoint (FIG. 40, steps 114 to 126, 144) and issues a request for processing to one of the processing circuits 321 to 329 in response to the result of the analysis (FIG. 40, steps 128 to 142, 146). The requested processing circuit processes the data on the connection data memory 21 based on the data of the ladder diagram.

The branches may come into each crosspoint of the ladder diagram from one or more of the four directions. Accordingly, there are sixteen different connections for the crosspoints including a case where there is no incoming branch, as shown in FIG. 13, in which solid lines indicate incoming branches and broken lines indicate no incoming branches.

For the convenience of explanation, it is assumed that the crosspoint scanning circuit 30 repeats the scan from an upper line to a lower line and scans from the left to the right in each line (FIG. 39, steps 100 to 112) to complete the scan of all crosspoints on the display screen.

When such a scan sequence is followed, the processing at each crosspoint is carried out in the following manner.

First, it is surveyed or determined whether a branch is coming down from an upper cell. If there is no branch coming from the upward cell, the node cell for that crosspoint is determined to be undefined. If necessary, a memory area for that node cell is newly retained and defined.

Then, it is determined if there is a branch coming from the left cell. If there is one, that branch cell is added to the left chain of the node cell for that crosspoint.

If there is a branch going to the right cell, a branch cell is newly defined to that branch and that branch cell is inserted at an appropriate position of the right chain of the node cell for that crosspoint.

Finally, when there is a branch extending downward, it indicates that there is a crosspoint belonging to the same node cell downward of the crosspoint in question. No processing is made for the downward extending branch because necessary processing will be made at the downward crosspoint.

FIG. 14 shows the classification for the connection pattern shown in FIG. 13 classified in accordance with the processing described above. This classification is made based on the presence or absence of the branches coming from an upper cell and/or a leftward cell. Category (a) indicates a case where there is no branch coming from an upper cell and there is a branch coming from the leftward cell; category (b) indicates a case where there are branches coming from an upper cell and the leftward cell; category (c) indicates a case where there is a branch coming from an upper cell and no branch coming from the leftward cell; category (d) indicates a case where there is no branch coming from either an upper cell or a leftward cell; category (e) indicates a case where no processing is made regardless of the branch condition; and category (f) indicates a case where a branch is coming from only one direction; it is an imperfect crosspoint and indicates an input error.

In the above classification, those crosspoints having branches coming from the rightward and/or downward cells are not taken into consideration because the crosspoint having the branch coming from the rightward cell may be first processed for the category to which it belongs and then a branch cell for that right branch may be generated and connected to the right chain of the node cell corresponding to that crosspoint, and the crosspoint having the branch coming from the downward cell requires no processing therefor.

Figure 41:
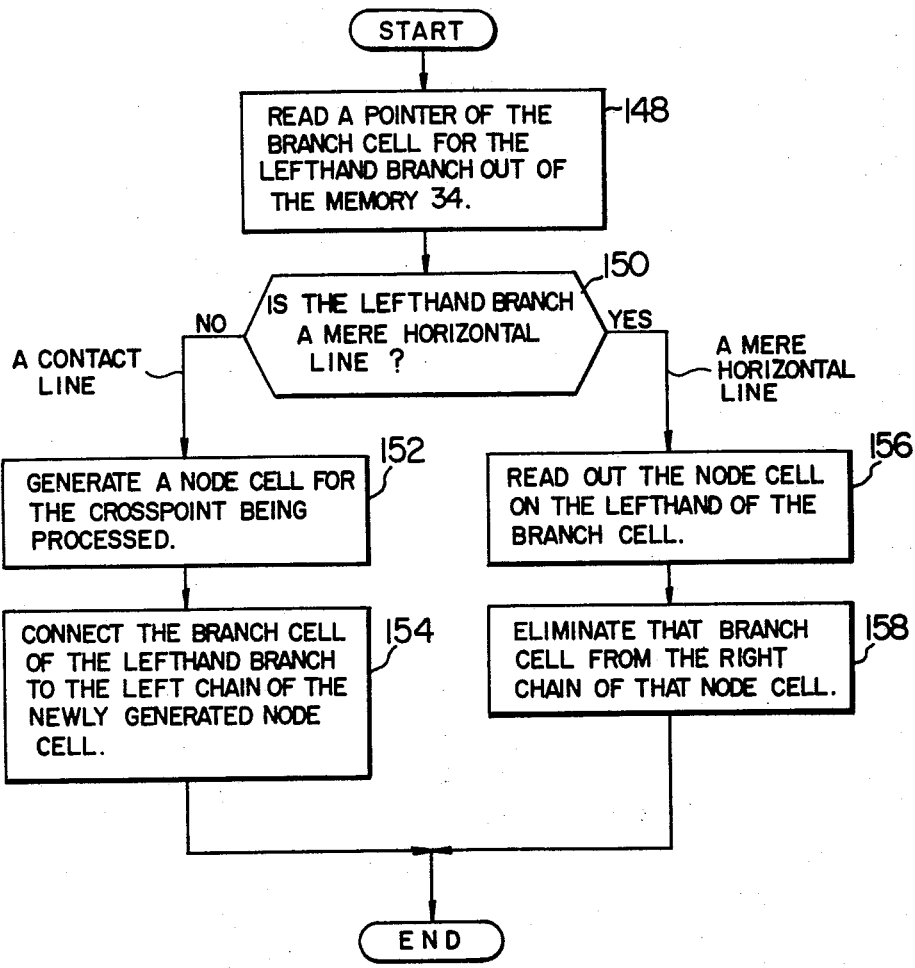
FIGS. 41 through 49 are flow charts illustrating the processing circuits 321 through 329, respectively, in FIG. 12.
Figure 42:
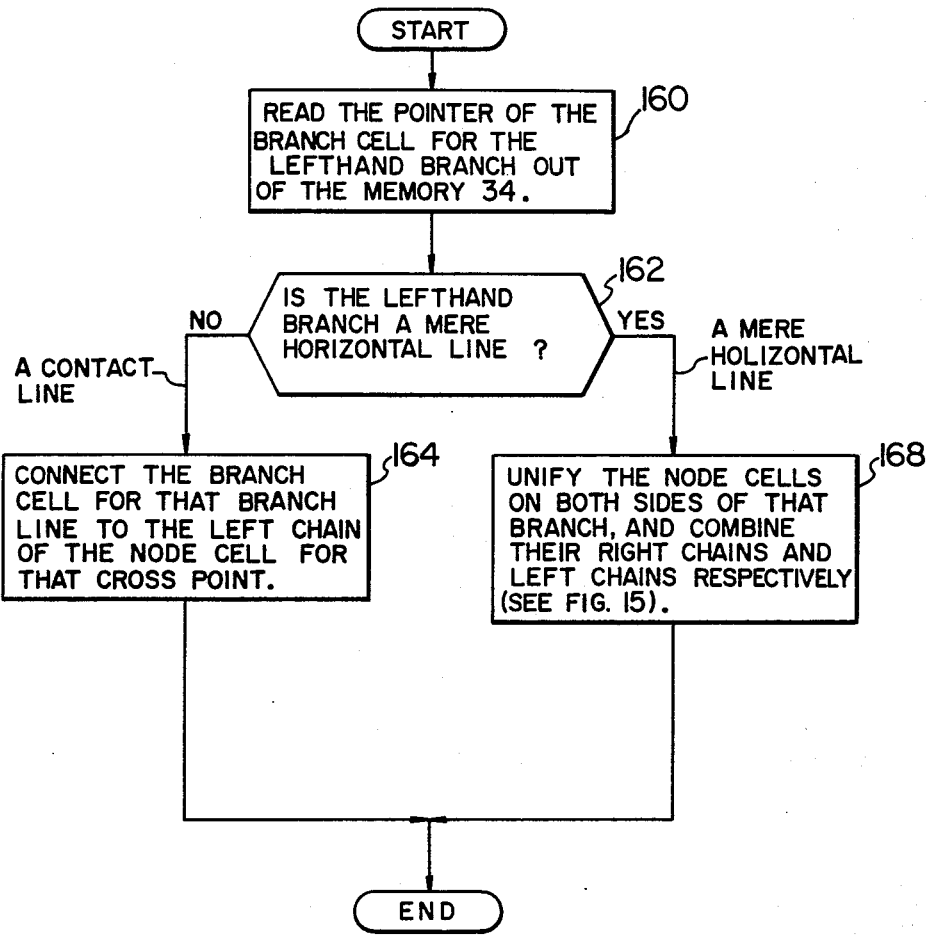

The processing circuits 321 to 329 in FIG. 12 are execution units for carrying out necessary processing in accordance with the categories (a) to (f) described above. The processing circuit 321 carries out the processing for the category (a), as seen in FIG. 41, steps 148–158, the processing circuit 322 carries out the processing for the category (b), as seen in FIG. 42, steps 160–168, and the processing circuits 323, 324, 325 and 326 carry out the processing for the categories (c), (d), (e) and (f), respectively. The branch detecting circuit 31 issues a request for processing to the processing circuits 321 through 326 (FIG. 40, steps 132 to 142), respectively, when the result of the analysis corresponds to the categories (a) to (f) of FIG. 14, as indicated in FIG. 40, steps 118 to 126. The processing circuit 327 generates the branch cells and connects them to the node cells. This circuit is provided in order to process a branch cell which has a rightward extending branch in accordance with the foregoing description. It is clear from FIG. 14 that such a branch cell belongs to one of the categories (a) to (d) and (f), but the category (f) relates to an input error which provides an error indication but requires no processing. Thus, the branch direction detecting circuit 31 issues the request for processing to the processing circuit 327 (FIG. 40, step 146), if there is a rightward branch in the cases of the categories (a) to (d) as seen in FIG. 40, step 144. The processing circuits 328 and 329 are leftmost and rightmost processing circuits of the ladder diagram, respectively, to be described later. The branch direction detecting circuit 31 issues a request for processing to the processing circuits 328 and 329 (FIG. 40, steps 128 and 129), respectively, when the result of the analysis corresponds to the leftmost and rightmost crosspoints, as indicated in FIG. 40, steps 114 and 116.

Referring to FIG. 14, the processing operations will now be described for each category.

Processing for the category (a) (FIG. 41):

A pointer for the branch cell for the lefthand branch is first read out (step 148).

This branch cell is generated at the crosspoint next to the left of the crosspoint being processed. This branch cell is connected to the right chain of the node cell for the above-mentioned left crosspoint, but it is in the unprocessed state for the left chain. The pointer for this branch cell must be temporarily stored at an appropriate location, when it is generated, for the subsequent processing. The memory 34 shown in FIG. 12 is provided for this purpose and it stores the values of each pointer for the unprocessed branch cells. The pointer for the branch cell mentioned above has been read out of that memory 34.

Then, a node cell for the crosspoint being processed is generated (step 152). This process is not necessary if the lefthand branch is a mere horizontal line including no contact or output coil (step 150). That is, in such a case, the crosspoint being processed and the lefthand crosspoint are considered to belong to the same node cell which has been already defined by the lefthand crosspoint, and hence that node cell may be used (step 156). Since the branch cell which conveys this information is ultimately unnecessary, it is eliminated at that point of time from the right chain of that node cell (step 158).

On the other hand, when the lefthand branch includes a contact, the node cell for that crosspoint is undefined. Thus, a new node cell is generated (step 152) and a branch cell of the lefthand branch is connected to the left chain of the newly generated node cell (step 154).

Processing for the category (b) (FIG. 42):

Like the processing for the category (a), the pointer of the branch cell for the lefthand branch is first read out from the memory 34 (step 160). It is determined whether that branch includes a contact or it is a mere horizontal line (step 162), and if it includes the contact, that branch cell is connected to the left chain of the node cell for that crosspoint (step 164). (The node cell for that crosspoint has already been defined by the upper crosspoint.)

On the other hand, when the lefthand branch is a mere horizontal line, that is, when the crosspoint being processed and the lefthand crosspoint belong to the same node cell, the following processing is necessary.

The node cell for that crosspoint has already been defined by the upward crosspoint. Tha node cell for the lefthand crosspoint also has already been defined. Since the horizontal line connecting both crosspoints means that the both crosspoints should belong to one and the same node cell, those two node cells and the left and right chains connected thereto must be combined.

Figure 15A:
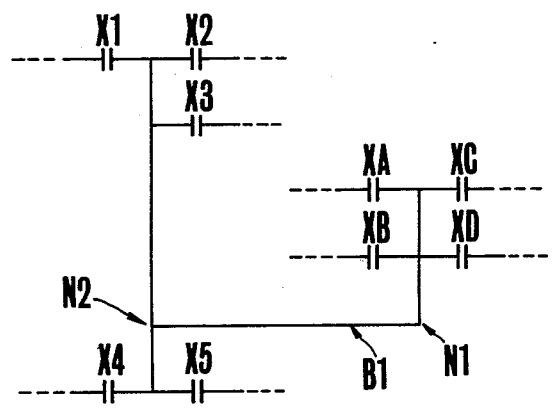
Figure 15B:
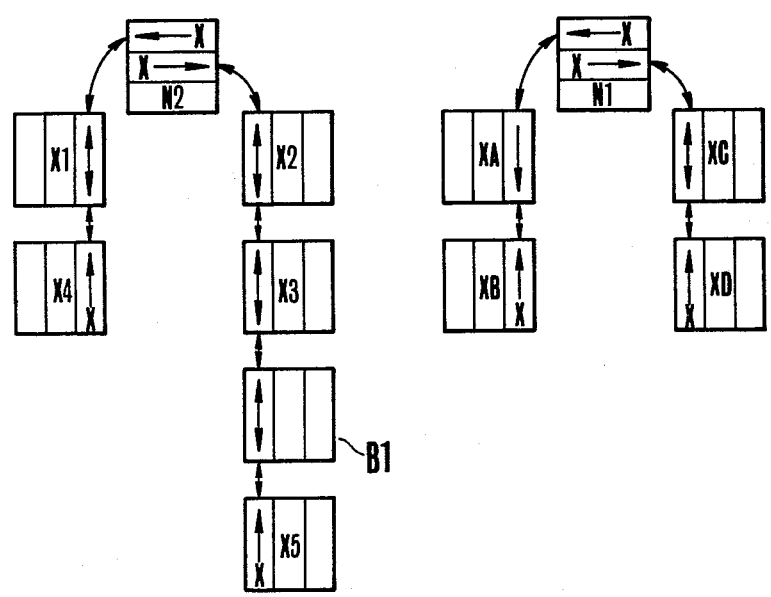
Figure 15C:
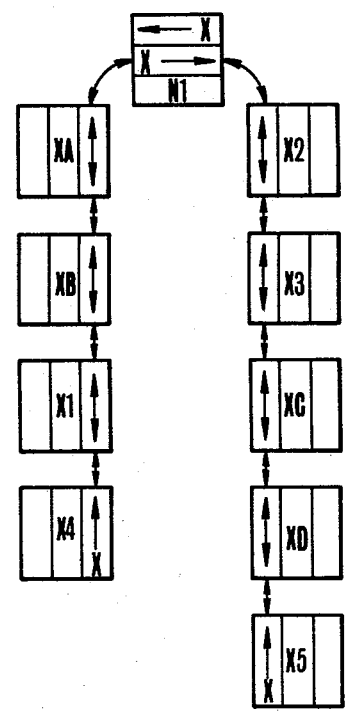

In order to carry out the above operation, one of the two cells is selected and the other is dispensed with. Then the two chains are combined to one (step 168). As for the left chains, the left chain of the node cell for the crosspoint being processed is a leading chain, and the left chain of the node cell for the lefthand crosspoint is connected to the bottom of the leading chain. As for the right chains, the branch cell, which is a mere horizontal line, previously read out is eliminated from the right chain of the node cell for the lefthand crosspoint, and the right chain of the node cell for the crosspoint being processed is inserted at the same position. This processing is illustrated in FIGS. 15a to 15c, in which FIG. 15a shows an example of a corresponding portion of a ladder diagram on which the processing is based, N1 in FIG. 15a shows the crosspoint being processed and N2 indicates the lefthand crosspoint. FIG. 15b shows connection data before consolidation processing and FIG. 15c shows connection data after the consolidation processing. B1 in FIG. 15b shows a branch cell for a mere horizontal line.

Figure 47:
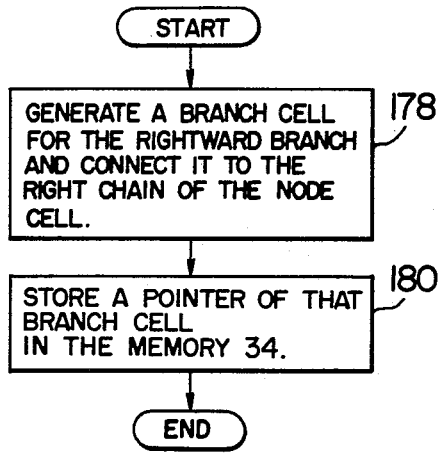

In the processing for the categories (a) and (b), if a branch is extending rightward, a branch cell for that rightward extending branch is generated after the processes described above have been completed and it is inserted into the right chain of the node cell for that crosspoint by means of the processing circuit 327 (FIG. 47, step 178). A pointer for the generated branch cell is stored in the memory 34 (FIG. 47, step 180) for subsequent processing.

Figure 43:
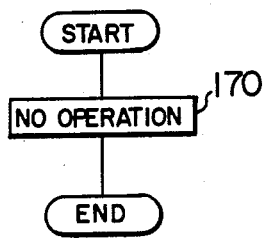

Processing for the category (c) (FIG. 43):

Since there is a branch extending from an upward crosspoint in this case, the node cell has already been defined. On the other hand, since there is no leftward branch, no process is required therefor within the processing circuit 324 (FIG. 43, step 170). A branch cell for the rightward branch is generated and it is connected to the right chain of the node cell by means of the processing circuit 327 (FIG. 47, step 178, 180).

Figure 44:
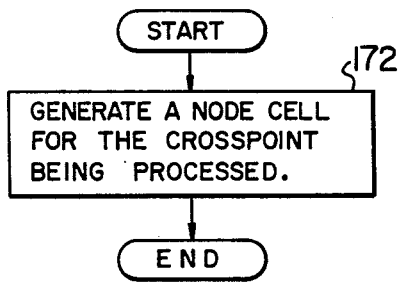

Processing for the category (d) (FIG. 44):

Since there is no branch extending from the upward crosspoint, a node cell for the crosspoint being processed is first generated by the processing circuit 324 (FIG. 44, step 172), and a branch cell for the rightward branch is generated and it is connected to the right chain of the generated node cell by the processing circuit 327 (FIG. 47, steps 178, 180).

Figure 45:
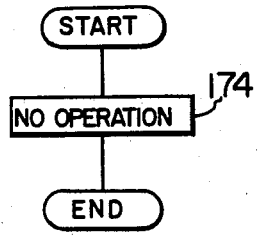

Processing for the category (e) FIG. 45):

For a connection pattern having no incoming branch, no process is required within the processing circuit 325 (FIG. 45, steps 174). For a pattern having only those branches extending from upward to downward crosspoints, no process is also required within the processing circuit 325 (FIG. 45, steps 174) because the node cell for that crosspoint has already been defined by the upward crosspoint (that is, the generation of a new node cell is not necessary), no process is required for the rightward and leftward branches since no such branch is included and no process is required for the downward branch at that crosspoint as described above.

Figure 46:
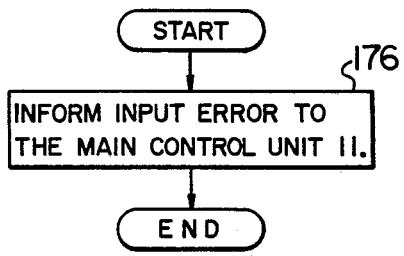

Processing for the category (f) (FIG. 46):

Since this is an input error as described above, the processing circuit 326 informs the main control unit 11 of the error (FIG. 46, step 176). In response thereto, the main control unit 11 issues a warning message to an operator through the display unit 10 including the CRT display.

The processes described so far are those for the intermediate crosspoints on the ladder diagram. The leftmost and rightmost ends of the ladder diagram are a power bus and a ground line, respectively. For those crosspoints, processes different from those described above are required. Those processes are carried out by the processing circuits 328 and 329 shown in FIG. 12.

Figure 48:
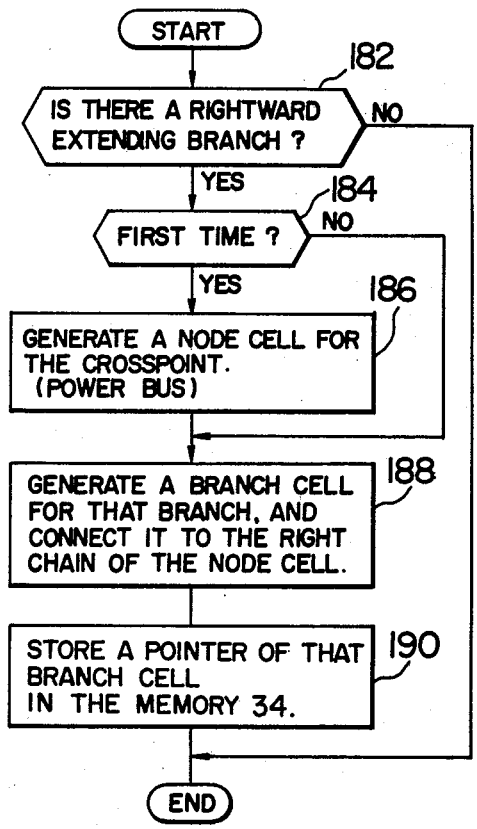

The leftmost crosspoints are all on the power bus. Thus, it is determined for each crosspoint whether there is a rightward extending branch (FIG. 48, step 182), and if there is one for the first time (step 184), a node cell is generated (step 186), and a branch cell for the rightward branch is generated and it is connected to the right chain of that node cell (step 188) and a right side pointer of that branch is stored in the memory 34 (step 190). Once the node cell has been generated (step 184), a branch cell is generated for each rightward branch (step 188) and it is connected to the right chain of the node cell (step 190).

Figure 49:
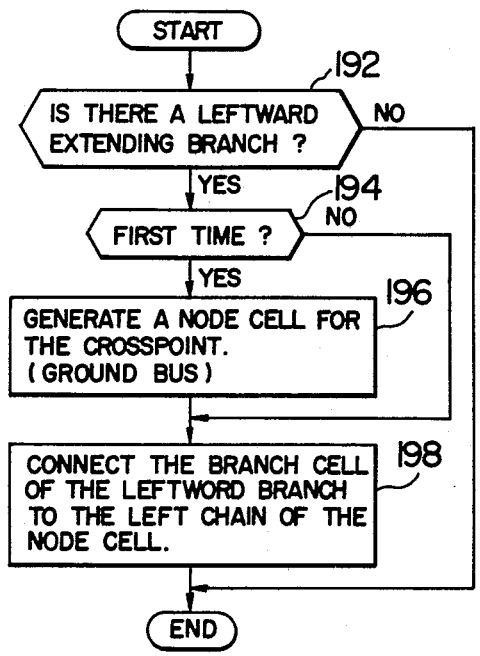

As for the rightmost crosspoint, it is determined whether there is a leftward extending branch (FIG. 49, step 192), and if there is one for the first time (step 194) a node cell for that crosspoint is generated (step 196), and the branch cell of the leftward branch is connected to the left chain of the generated node cell (step 198). Usually, the leftmost branch is a branch for an output coil. If only one output circuit is permitted, the process ends, but if the connection of a plurality of output coils is permitted, whenever the leftward extending branches are picked up after the first one the branch cells for those branches are all connected to the left chain of the node cell (step 198).

The processing of the connection data extracting unit 20 has thus been described.

In the explanation described above, the construction of the connection data memory 21 has been shown only diagramatically. FIGS. 16a to 16d show specific examples thereof.

Figures 16A, 16B:

FIG. 16a shows a structure of the node cell. It comprises three words. The first word L stores a leading pointer of the left chain of the node cell. More particularly, it stores a pointer (e.g. a memory address) of that branch cell which is to be first connected to the node cell on the left chain. Similarly, the second word R stores a leading pointer of the right chain of the node cell, that is, a pointer of the first branch cell which follows to the node cell on the right chain. The third word stores a mark N indicating that the cell is a node cell. Since only one bit is required for that mark (because it is only needed to distinguish between the node cell and the branch cell), it may be accommodated in a portion of the first and second words, but one additional word is allocated for that bit in order to match the number of words with that for the branch cell to be described later. Thus, three words are used for the node cell.

FIG. 16b shows a structure of the branch cell. Like the node cell, the first word L stores a pointer for the left chain, that is, a pointer (e.g. a memory address) of the branch cell which follows the branch cell in question on the left chain. If there is no succeeding branch cell, a pointer for the node cell which indicates a start point of the left chain is stored. As a result, the node cell and the branch cell on the left chain are connected in a ring so that one can start from a cell and follow the associated left chain to reach any other cell on the left chain. The second word R similarly stores a pointer for the right chain, that is, a pointer for the succeeding branch cell on the right chain. Like in the case of left chain, if there is no succeeding branch cell, a pointer for the node cell indicating a start point of the right chain is stored therein. As a result, like in the case of the left chain, the cells are connected in a ring so that a desired cell can be readily searched. The third word stores a mark bit B indicating that the cell is a branch cell and information regarding that branch cell, more particularly an address A in the refresh memory 7 of the contact or output coil in the ladder diagram corresponding to that branch cell.

Figure 16C:
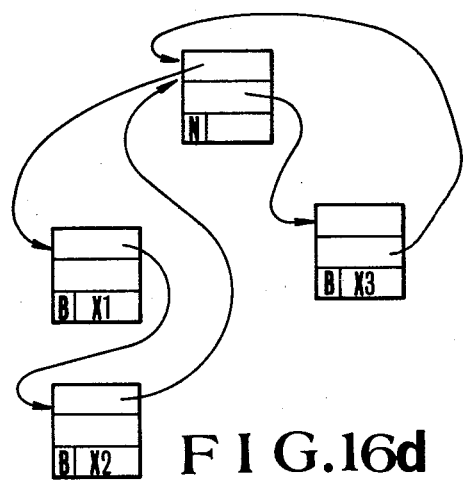

FIG. 16c shows the connection of the node cell and the branch cell. In this example, connected to the left chain of one node cell are two branch cells, and one branch cell is connected to the right chain.

Figure 16D:
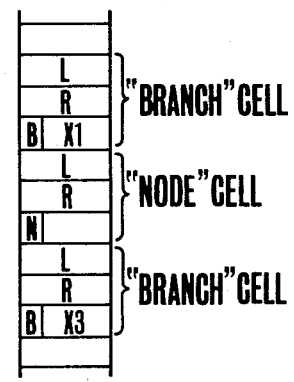

Coded information relating to these cells is stored contiguously in the connection date memory 21, as shown in FIG. 16d. The addition, insertion or deletion of the cells for the chains in the course of the connection data extracting process can be carried out by altering the values of the pointers without moving the cells on the connection data memory 21.

In this example, when the number of cells connected to the respective chain is large, the process time is long when it is desired to go from one cell to the preceding cell because the path must go around the loop chain. By providing not only a forward pointer but also a backward pointer of each of the cells for the respective chain, the process time required for going back to the preceding cell can be shortened. In this case, however, each cell comprises five words and the capacity required for the connection data memory increases.

Figure 17:
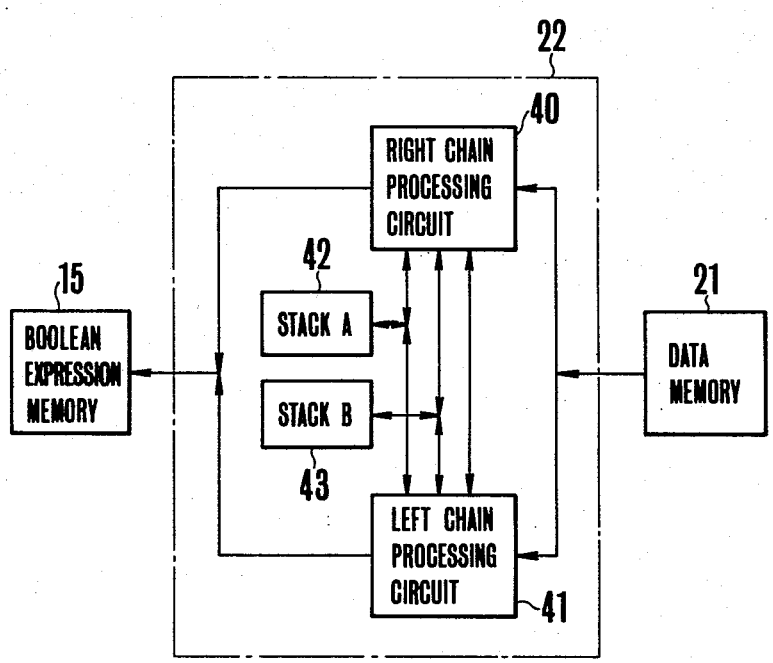

Referring to FIG. 17, the process in the Boolean expression converting unit 22 is now explained.

In this process, data generated and stored in the connection data memory 21 is used to follow the branch cells and the node cells alternately starting from the node cell corresponding to the power bus to convert them to a Boolean expression.

In the converting unit 22 of FIG. 17, numeral 40 denotes a right chain processing circuit, 41 denotes a left chain processing circuit, and 42 and 43 denote a stacked temporary memories. Hereinafter, the memories 42 and 43 are referred to as stack A and stack B, respectively.

Figure 18:
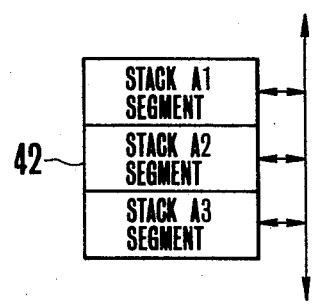

The stack A serves to temporarily buffer a block information in the course of a converting process. (The block is defined herein to be a one-level nesting structure consisting of a pair of branching node cell and connecting node cell. The nesting structure corresponds to a portion enclosed by a pair of left and right brackets in a Boolean expression. The branching node cell is a node cell having two or more branch cells connected to the right chain thereof, and the connecting node cell is a node cell having two or more branch cells connected to the left chain thereof.) The stack B serves to temporarily buffer a partially generated Boolean expression in the course of the process. The stack A comprises three stack segments A1 to A3 as shown in FIG. 18. The stack segment A1 stores a pointer for the branching node cell, the stack segment A2 stores a pointer for the connecting node cell and the stack segment A3 stores a processing status for the block.

The process in the converting unit 22 basically comprises two parts, one being a processing part for the right chain of the node cell and the other being a processing part for the left chain of another node cell to which the branch cell derived in the first part is connected. The right chain processing circuit 40 and the left chain processing circuit 41 in FIG. 17 are in charge of those processing parts, respectively, and they process alternately to convert the connection data to the Boolean expression.

The right chain processing circuit 40 is first explained.

Figure 50:
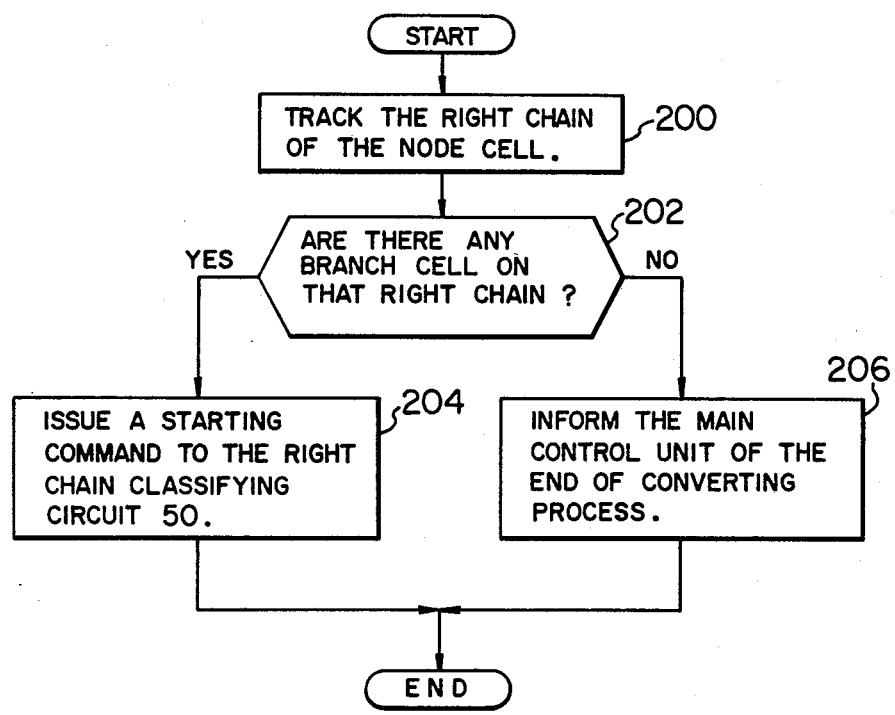
FIG. 50 is a flow chart illustrating the operation of the completion detection circuit 51 in FIG. 19.

FIG. 19 shows a configuration of an embodiment, in which numeral 50 denotes a right chain classifying circuit, 51 denotes a completion detecting circuit, and 521 to 524 denote processing circuits. Numeral 53 denotes a readout signal from the connection data memory 21. In the right chain processing circuit 40, the completion detecting circuit 51 first tracks the right chain starting from the node cell to derive a leading branch cell connected thereto (FIG. 50, step 200). If there is no branch cell connected to the right chain (step 202), that branch cell is a node cell corresponding to the grounded portion in the original ladder diagram and the converting process is terminated. Thus, the completion detecting circuit then indicates that to the main control unit 11 through a signal line 54 (step 206).

When the branch cell connected to the right chain is present, a starting command to the right chain classifying circuit 50 is issued (step 240) and that branch cell is classified in accordance with the position connecting to the right chain in the manner shown in FIGS. 20a to 20d, in which circles indicate the node cells and solid lines indicate the branch cells. Of the solid line branch cells, those shown by thick solid lines indicate the branch cells under consideration. Accordingly, the thick solid line in FIG. 20a indicates a single branch cell of the node cell having the right chain with only that single branch cell connected thereto. The thick solid line in FIG. 20b indicates a node cell having the right chain with a plurality of branch cells connected thereto, that is, the uppermost branch cell in the branching node cell. The thick solid line in FIG. 20c indicates an intermediate branch cell of the branching node cell. (That is, other branch cells are present upward and downward and hence the branching node cell has three or more branch cells.) The thick solid line in FIG. 20d indicates the lowermost branch cell of the branching node cell.

The right chain classifying circuit 50 classifies those chains and issues processing commands sequentially to the corresponding ones of the processing circuit 521 to 524, which sequentially execute the processes corresponding to the categories shown in FIGS. 20a to 20d.

Figure 51:
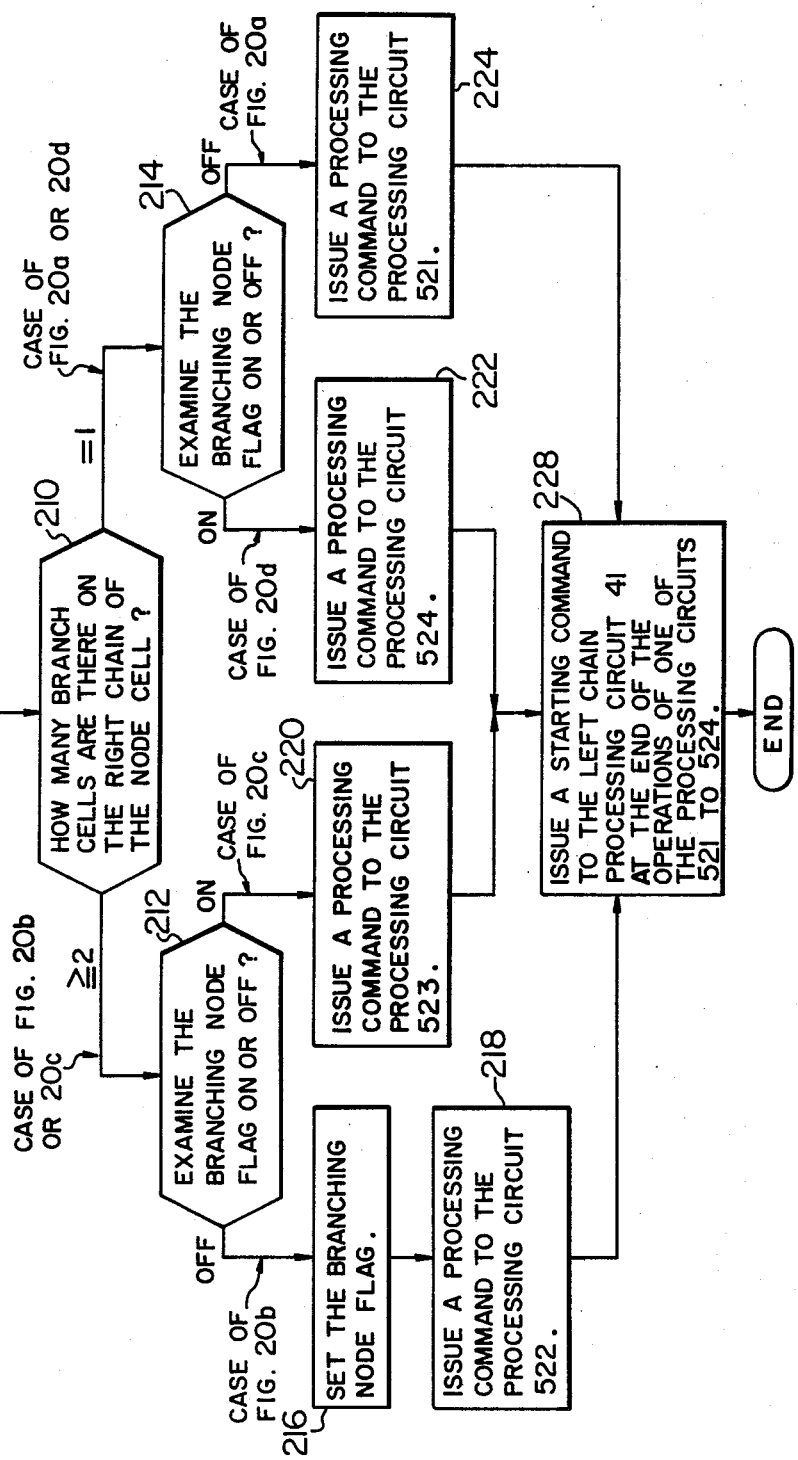
FIG. 51 is a flow chart illustrating the operation of the write chain classifying circuit 50 of FIG. 19.

The right chain classifying circuit 50 carries out the following operations (FIG. 51):

It first determines the number of branch cells connected to the right chain (step 210). If it is more than one, it is determined that it corresponds to the category shown in FIG. 20b or 20c, and if the number is one it is determined that it corresponds to the category shown in FIG. 20a or 20d. (In each case, after the corresponding processing operation has been completed, the branch cell is disconnected from the right chain to shorten the right chain. As a result, when the same node cell is processed again, only one branch cell is present in the right chain in the case of FIG. 20d as well as in the case of FIG. 20a.)

The distinction between the cases of FIGS. 20b and 20c and the cases of FIGS. 20a and 20d is determined in the following manner: Each node cell is provided with a unique flag bit (hereinafter referred to as a branching node flag) which is initially set to an off state. The right chain of the respective node cell is then processed to determine the number of the branch cells. If it is determined that it corresponds to the case of FIG. 20b or 20c, the branching node flag is referred to (step 212) and if it is off it is determined that the right chain is the first incoming right chain. That is, the leading branch cell connected thereto is the uppermost branch cell in the branching node. This corresponds to the case of FIG. 20b. For the convenience of the subsequent processing operation, the branching node flag is then set to an on state (step 216). If the branching node flag is on, it indicates that the right chain has already been accessed at least once. This corresponds to the case of FIG. 20c.

When the determination by the number of the branch cells resulted in the case of FIG. 20a or 20d, the branching node flag is referred to (step 214) and if it is off, the case of FIG. 20a is determined, and if it is on the case of FIG. 20d is determined.

Depending on the result of determination, the right chain classifying circuit 50 in FIG. 19 issues a processing command to a corresponding one of the processing circuits 521 to 524 (steps 218 through 224). When the operations of one of the processing circuits 521 to 524 are completed, the right chain classifying circuit 50 issues a starting command to the left chain processing circuit 41 (step 228), since the right chain processing circuit 40 and the left chain processing circuit 41 are operated alternately, as already indicated. The processing operations in the respective processing circuits will now be described in sequence.

A signal line 55 in FIG. 19 is a communicating signal line to and from the left chain processing circuit 41, signal lines 56 and 57 are read/write signal lines for the stacks A and B, respectively, and a signal line 58 is a write signal line for the Boolean expression memory 15.

Figure 52:
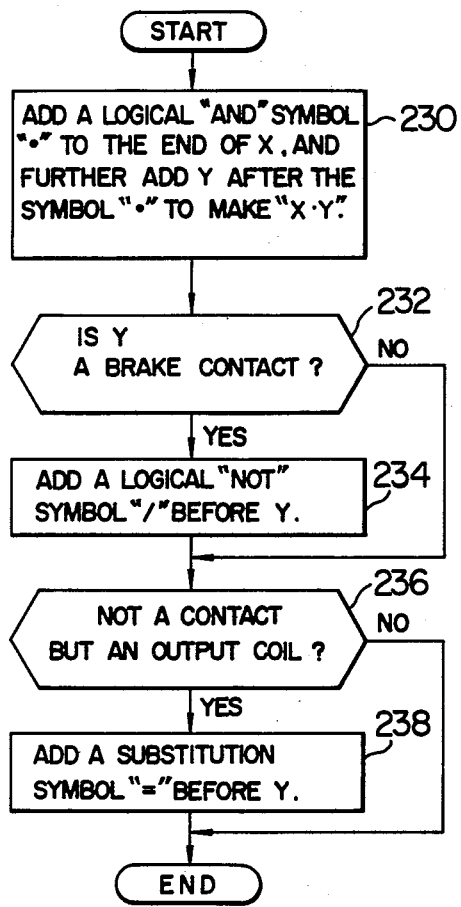

Case of FIG. 20a (processed by the processing circuit 521) (FIG. 52):

A logical AND symbol "·" is added to the end of a partial Boolean expression generated so far, and the name of the contact corresponding to the branch cell being processed is further added is step 230 after the symbol "·". If the corresponding contact (step 232) is a brake contact, a logical NOT symbol "/" is added before the name of contact (step 234). If it is not a contact but an output coil (step 236), a substitution symbol "=" is added, followed by the name of output coil (step 238).

Figure 53:
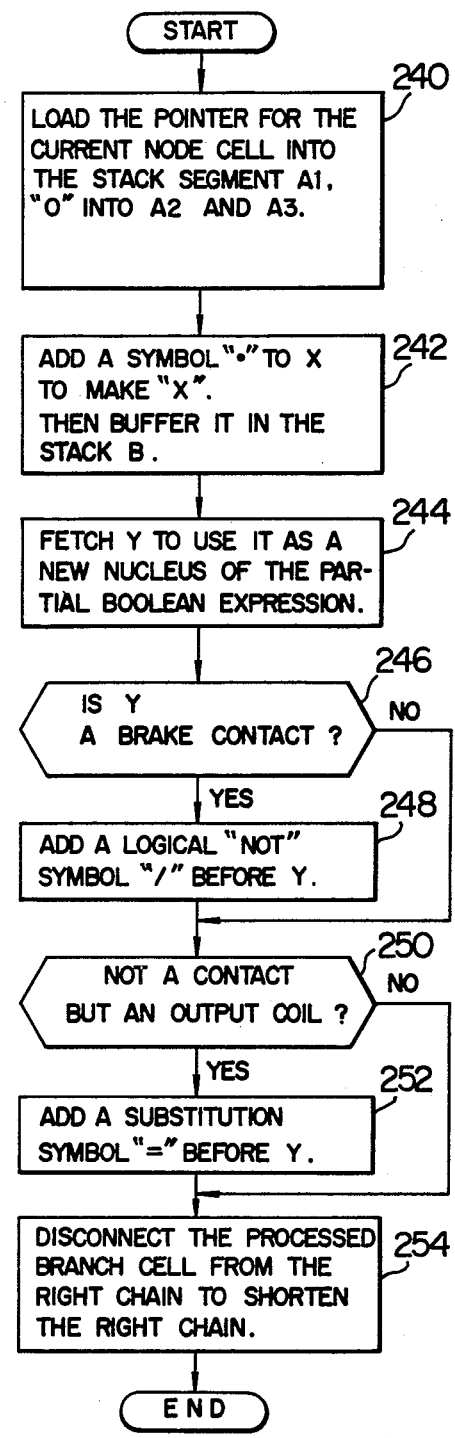

This completes the process for the case of FIG. 20a. In the processing operations to be described hereinafter, the process of adding the name of the contact is frequently executed. In such cases, the same processes for the brake contact and the output coil as those (steps 232 to 238) described above are followed, as seen in FIGS. 53, 54 and 55.

Case of FIG. 20b (processed by the processing circuit 522) (FIG. 53):

This process is for the first branch cell of the branching node cell, which indicates the initiation of a new block. It is thus necessary to secure an information area for that block in the stack A and arrange the information. Specifically, the pointer for the current node cell is loaded in the stack segment A1 and "0's" are loaded in the stack segments A2 and A3 (step 240). Although a pointer for the connecting node cell is to be loaded in the stack segment A2, "0" is tentatively loaded because the former is undefined at this time. The stack segment A3 stores a processing status of the block. It specifically stores a one-bit flag indicating that whether the lowermost branch cell is reached in the branching node cell of that block. It is initially set to "0".

Then, a symbol "·" is added to the partial Boolean expression being developed and the entire partial Boolean expression being processed is buffered in the stack B.

Next, the name of the contact corresponding to the current branch cell is fetched to use it as a new nucleus of the partial Boolean expression (step 244).

Finally, after processing steps 246 to 252 in a similar way to the case of FIG. 20a, the processed branch cell is disconnected from the right chain to shorten the right chain (step 254).

Case of FIG. 20c (processed by the processing circuit 523) (FIG. 54):

This process is for an intermediate branch cell of the branching node cell. As will be described later, the branching node cell of this type is processed depending on the result of the process for the connecting node cell paired with that branching node cell. Before reaching that connecting node cell, the branch cells above the current branch cell are processed, and the partial Boolean expression developed before the connecting node cell is reached has already been buffered in the stack B in the process for the connecting node cell.

Thus, for this branching node cell, the name of contact corresponding to the current branch cell is first fetched to use it as a new nucleus for the partial Boolean expression (step 256) and then after processing steps 258 to 264 in a similar way to the case of FIG. 20a, the processed branch cell is disconnected from the right chain to shorten the right chain (step 268).

Case of FIG. 20d (processed by the processing circuit 524) (FIG. 55):

This is similar to the case of FIG. 20c, but in addition to the same process (steps 270 to 279) as the steps 256 to 268 for the case of FIG. 20c, the leading bit of the stack segment A3 is changed from "0" to "1" (step 280) to indicate that the lowermost branch cell of the right chain of the branching node cell has been reached.

The processing operations of the right chain processing circuit 40 have thus been described.

Next, by means of the left chain processing circuit 41, the other end of the current branch cell is traced to seek for another node cell which has a left chain connected to the current branch cell and processing for the left chain of that node cell is performed, as described below.

FIG. 21 shows a configuration of an embodiment of the left chain processing circuit 41. It is essentially same as the right chain processing circuit 40. Numeral 60 denotes a left chain classifying circuit, and 611 to 613 denote processing circuits for the respective categories of the left chains. Numerals 53 and 55 to 58 denote signal lines similar to those shown in FIG. 19.

Like the right chains, the left chains can be classified in accordance with the positions connecting to the branch cells, in the manner shown in FIG. 22. Like in FIG. 20, thick solid lines indicate the branch cells under consideration.

The determination of the category of the respective branch cell is carried out by the left chain classifying circut 60 in the same manner as is done for the right chains, that is, based on the number of branch cells connected to a left chain of a node cell, to the left chain of which the current branch cell is connected and a connecting node flag additionally provided for each node cell which is initially set to an off state. The node cell to the left chain of which the current branch cell is connected can be determined by tracing an end of the current branch cell, wherein the end of the current branch cell is to be connected to a left chain of another node cell.

In summary, the cases of FIGS. 22a and 22b can be discriminated from the cases of FIGS. 22c and 22d by detecting the number of branch cells connected to the left chain of a node cell, to the left chain of which the current node cell is connected (step 284). The case of FIG. 22b can be discriminated from the case of FIG. 22c by examining the connecting node flag (step 284). The case of FIG. 22a can be discriminated from the case of FIG. 22d by examining the connecting node flag (step 288). When the determination of the category is made, the left chain classifying circuit 60 issues a processing command to the corresponding one of the processors 611 to 613 (steps 290 to 294), except for the case of FIG. 22a. For the case of FIG. 22a, no processing is necessary, as will be explained hereafter, with the result that no processing circuit is provided for this case. At the end of the operation of one of the processing circuits 611 to 613, a starting command is issued to the right chain processing circuit 40 (step 296). It is to be noted that the setting of the connecting node flag required for the case of FIG. 22b is performed not by the left chain classifying circuit 60, but by the processing circuit 611, as will be explained later, although the branching node flag is set by the right chain classifying circuit 50 for the case of FIG. 20b.

The processing operations for the cases of FIGS. 22a to 22d will now be explained in sequence.

Case of FIG. 22a:

The necessary process has already been done in the process for the right chain (the process for the case of FIG. 20a). The only necessary process left is to disconnect the branch cell from the left chain and delete it, but this process is not absolutely necessary. Accordingly, in this case, no process is necessary.

Case of FIG. 22b (processed by the processing circuit 611) (FIG. 57):

Like in the case of FIG. 20b, the connecting node flag of the current node cell is first set to the on state (step 298). Then, the value of the leading bit in the stack segment A2 is determined (step 300). Depending on whether it is "0" or not, one of the following steps 302, 304 is carried out for the following reason.

The uppermost branch cells of the connecting node cell are classified into two categories, depending on the relation to the opposing branching node cell, as shown in FIG. 23, in which FIG. 23a shows a case where the connecting branch cell is the uppermost cell in both the branching node cell and the connecting node cell. (In this case, it is not necessary that the branch cell connecting to the branching node cell and the connecting node cell are the same one. It is only necessary that the above requirement is met when a combined branch cell connecting those node cells is regarded as a single branch. The same is applicable to the following description.) FIG. 23b shows a case where the cell is the uppermost branch cell in the connecting node cell but it is the intermediate branch cell in the branching node cell. The value of the top of the stack segment A2 is "0" for the case of FIG. 23a because it has not yet been defined. Thus, it is changed from "0" to the value of the pointer of the current node cell (step 304).

For the case of FIG. 23b, the value of the top of the stack segment A2 is not "0", but the value of the pointer of the connecting node cell of the branch cells above the branch cell being processed should have been loaded in that position. However, the branch cell being processed is the uppermost branch cell of the current connecting node cell. In other words, when the process started from the branching node cell in FIG. 23b, it was tentatively assumed that the cell was the intermediate branch cell of the block having three or more branch cells, but it is found when the current connecting node cell is reached that this branch cell must be the uppermost branch cell of another block (which forms a nesting structure with the block being processed). The process then proceeds as follows.

The branching node cells of the new block and the previous block are the same. Therefore, the value of the top of the stack segment A1 (the pointer for the branching node cell) is reloaded in the stack top. The pointer for the current connecting node cell is loaded in the stack segment A2. A value of "0" is loaded in the stack segment A3 (step 302).

After the processes for the stack A described above have been completed, the following process is executed.

A logical OR symbol "+" is added to the current partial Boolean expression and it is buffered in the stack B (step 306). Then, the current branch cell is disconnected from the left chain to shorten the left chain (step 308). The node cell specified by the value of the top of the stack segment A1 is a node cell to be processed next. (The level of the stack segment A1 remains unchanged.)

Figure 58A:
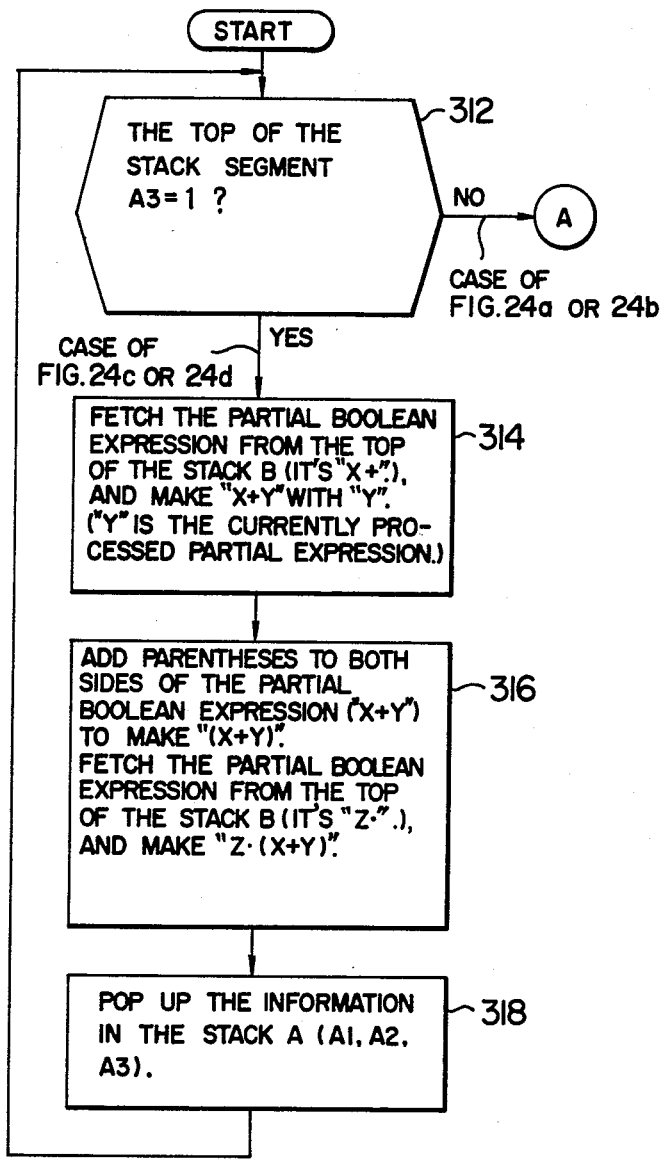

Case of FIG. 22c (processed by the processing circuit 612) (FIGS. 58A, 58B):

Like in the case of FIG. 22b, the process is classified as shown in FIG. 24 depending on the relation to the opposing branching node cell and the arrangement of the branch connecting the branching node cell with the connecting node cell. FIG. 24a shows a case where the branch cell being processed is the intermediate branch cell in both the branching node cell and the connecting node cell. FIG. 24b shows a case where the branch cell being processed is the intermediate branch cell in the connecting node cell and is the uppermost branch cell in the branching node cell. FIG. 24c shows a case where the branch cell being processed is the lowermost branch in the opposing branching node cell. (In this case, the top of the stack segment A3 is "1".)

Figure 24A:
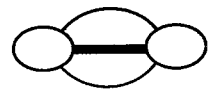
Figure 24B:
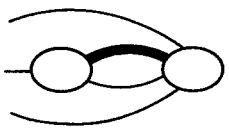
Figure 24C:
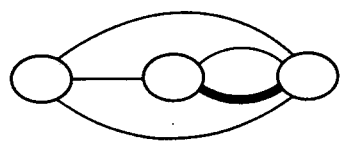
Figure 24D:
Figure 25:
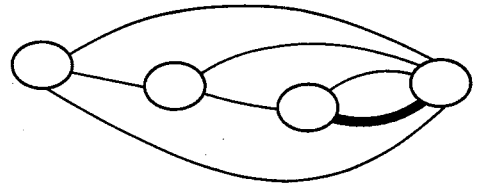

FIG. 24d shows a case where the branch cell being processed is the lowermost branch cell in the opposing branching node cell, like in the case of FIG. 24c, but it is the uppermost branch cell when the block consisting of the connecting node cell and the branching node cell and the preceding branch cell are combined to regard them as a single branch cell. On the other hand, in the case of FIG. 24c, the combined branch cell is the intermediate branch cell.

In the cases of FIGS. 24c and 24d, since the process has proceeded through the lowermost branch cell of the block consisting of the current connecting node cell and the opposing branching node cell to the connecting node cell, it is necessary to carry out the completion process for that block. This is detected by referring to the leading bit of the stack segment A3. In the cases of FIGS. 24c and 24d, the leading bit of the stack segment A3 is set to "1" because the branch cell being processed is the lowermost branch cell in the opposing branching node cell. On the contrary, the cases of FIGS. 24A and 24B, the leading bit of the stack segment A3 is set to "0" because the branch cell being processed is not the lowermost branch cell in the opposing branch node cell.

The case of FIG. 24d may occur not only in the form of simplex block but also in the form of a duplex block or a more complex nesting structure in which the completion process for the respective block has not been finished.

Thus, for the case of FIG. 24c or 24d, the top bit of the stack segment A3 is first determined (step 312), and if it is "1", the following process (steps 314 to 318) is executed. (If the above condition is not met, the following steps or processings (steps 314 to 318) are skipped.)

The partial Boolean expression at the leading position of the stack B is first fetched and the partial Boolean expression being processed is connected thereto. At this time, the leading positions of the stack B should have stored "X+" (where X represents the partial Boolean expression generated so far in the block). Thus, "X+Y" is stored in the stack B after the above process, where Y represents the current partial Boolean expression (step 314). This expression is bracketed at the opposite ends thereof. Then, the partial Boolean expression at the leading positions of the stack B (which is to be "Z·" at this time) is again fetched and it is added in front of the partial Boolean expression derived in the above process (step 316), resulting in the expression "Z·(X+Y)".

This completes the process for one block. The contents of the stack segments A1, A2 and A3 are popped up in order to provide the data at the top of these segments (step 318), and the leading bit of the stack segment A3 is again determined (step 312). If it is again "1", the block completion process described above is repeated. If it is "0", the process is completed and the following process is performed.

The result of the above process is consolidated in the form of FIG. 24a or in the form of FIG. 24b, when, the block to which the completion process has been carried out is regarded as a single branch cell. When the block completion process described above is not carried out, that is, when the branch cell connected to the opposing branching node cell is the intermediate or uppermost branch cell, the result is in the form of FIG. 24a or FIG. 24b, respectively, as a matter of course.

Figure 58B:
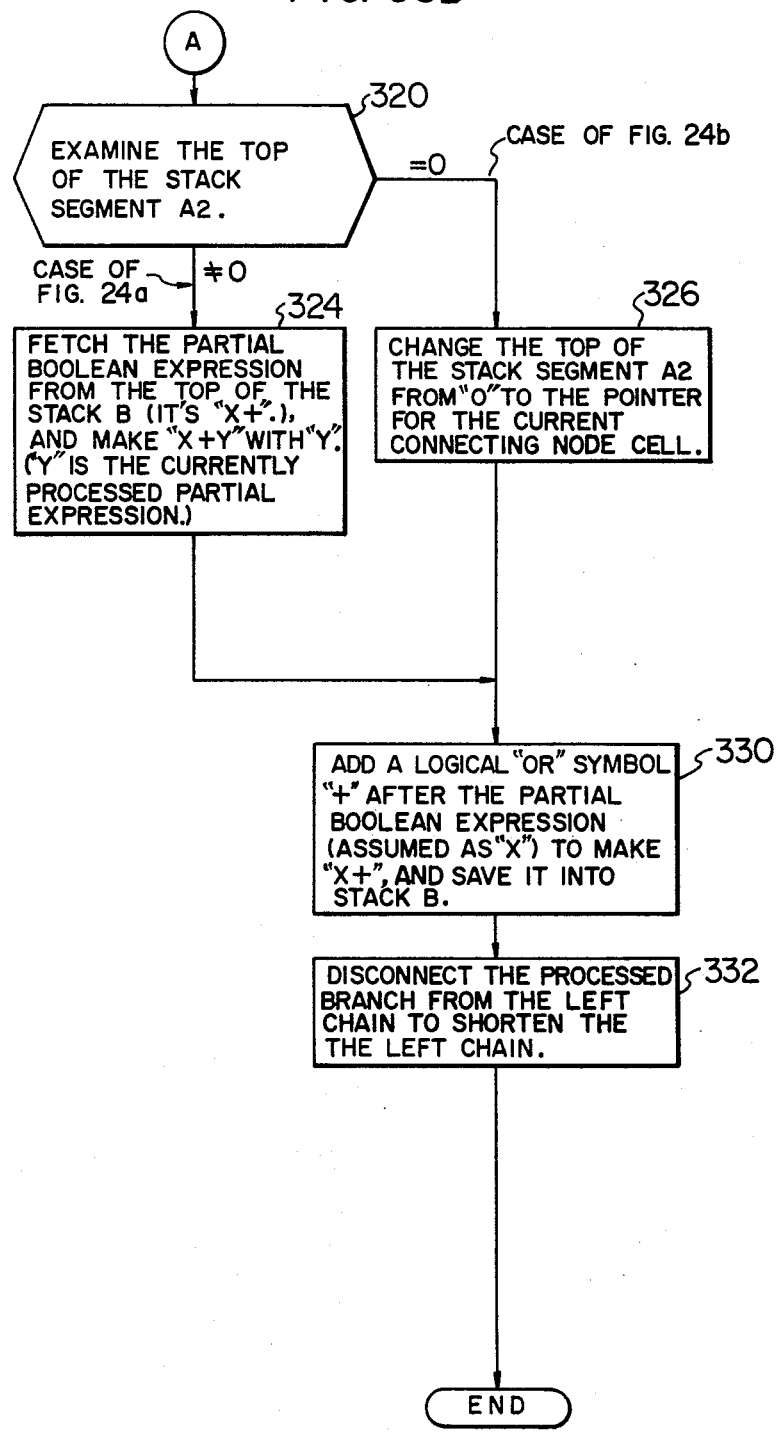

The process is different for each of the above two cases. Discrimination of the cases of FIGS. 24a and 24b can be accomplished by examining the top of the stack segment A2 (FIG. 58B, step 320). In the case of FIG. 24A, the pointer for the current connecting node cell is stored at the top of the stack segment A2 because the branch cell being processed is an intermediate branch cell within a block under consideration and the top of the stack segment A2 holds the pointer which was loaded according to step 504 (FIG. 57) when the uppermost branch cell within the same block was processed. In the case of FIG. 24B, the top of the stack segment A2 remains zero because the branch cell being processed is the uppermost branch cell within a block under consideration and it has not yet received a processing for reaching a corresponding connecting node cell, as described for the case of FIG. 23a in FIG. 57 (especially refer to the step 304 of FIG. 57). In the case of FIG. 24a, the partial Boolean expression corresponding to the uppermost, branch shown in FIG. 24a, stored at the leading positions of the stack B is fetched and the current partial Boolean expression is added behind it (step 324). At this time, the leading positions of the stack B should have stored "X+", to which the current partial Boolean expression "Y" is added to result in "X+Y".

In the case of FIG. 23a, since the top of the stack segment A2 is "0", it is changed to the value of the pointer for the current connecting node cell (FIG. 57, step 304) as explained previously. The case of FIG. 24b is similar to the case of FIG. 23a and the process therefor is also similar (FIG. 58B, step 326).

After the above process has been completed, a logical OR symbol "+" is added behind the current partial Boolean expression and it is saved in the stack B (step 330), like in the process for the case of FIG. 22b. Then the current branch cell is disconnected from the left chain to shorten the left chain (step 332). The value at the top position of the stack segment A1 is then used to point to the node cell to be processed next by the right chain processing circuit 40. This completes the process for the case of FIG. 22c.

Case of FIG. 22d (processed by the processing circuit 613) (FIGS. 59A to 59D):

Since the lowermost branch cell in the connecting node cell is included, the block completion process is required.

The partial Boolean expression at the leading positions of the stack B (which store "X+" and the current partial Boolean expression ("Y") are combined and bracketed (step 338) (to result in "(X+Y)").

Figure 26:
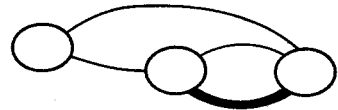

Like in the case of FIG. 22c, the case of FIG. 22d may include a case where the blocks are multiplexed as shown in FIG. 26 and the completion processes therefor have not been finished. In such a case, the block completion process should be carried out as many times as possible.

Figure 27A:
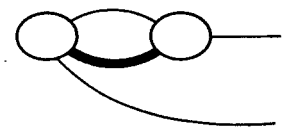
Figure 27B:
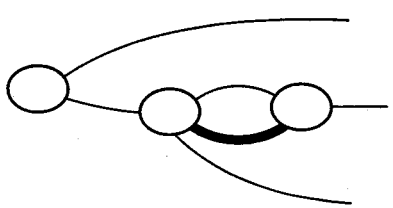
Figure 27C:
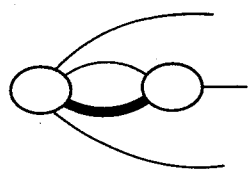

In order to determine the occurence of such case, the top of the stack segment A3 is checked (step 340). If it is "0", this block is in the form as shown in FIG. 27a, 27b or 27c in which the cell is not the lowermost branch cell in the branching node cell. Thus, the block completion process is terminated at this point. However, as shown in FIG. 27a or 27b, if the block, when viewed as a single combined branch, is the uppermost branch cell for the branching node cell, that is, if it can be reduced to the form shown in FIG. 20b, a block outside of the combined block is in a starting condition and hence the block start process is to be carried out. Thus, the information of the block to which the completion process has been carried out, stored in the stack A is popped up and new block information is stored in the stack A. The content of the stack segment A1 is the pointer for the branching node cell of the old block. Therefore, it need not be changed because it is the same as the pointer for the branching node cell of the new block. The content of the stack segment A3 need also not be changed because it is "0" as the result of the initial determination. Accordingly, it is only needed in order to carry out the start process to change the value of the top of the stack segment A2 to "0" (FIG. 59B, step 356).

The condition as shown in FIG. 27a can be detected in the following manner. The number of data stored in the stack segment A is first determined (FIG. 59B, step 350). If it is one, or in other words if only the information of the block to which the completion process has been carried out is stored, it is determined that the condition of FIG. 27a is met. Hence, the start process (step 356) is carried out as explained previously. If the number of data in the stack A is two or more, the leading two values of the stack segment A1 are compared (FIG. 59B, step 352). If they are equal, it is determined that the condition of FIG. 27c is met, and if they are not equal, it is determined that the condition of FIG. 27b is met. The condition of FIG. 27b also needs the start process (FIG. 59B, step 356) as described above. In the case of FIG. 27c, the start process is not necessary, because the block for which the completion process has been carried out can be regarded as an intermediate branch cell. The popping up of information for the block from the tops of the stack A (A1, A2, A3) to supply this data (step 358) is only needed when the completion process has been finished.

The process for the case where the leading bit of the stack segment A3 is "0" has thus been described. The process of FIG. 27a, 27b or 27c also terminates at this point.

Figure 59A:
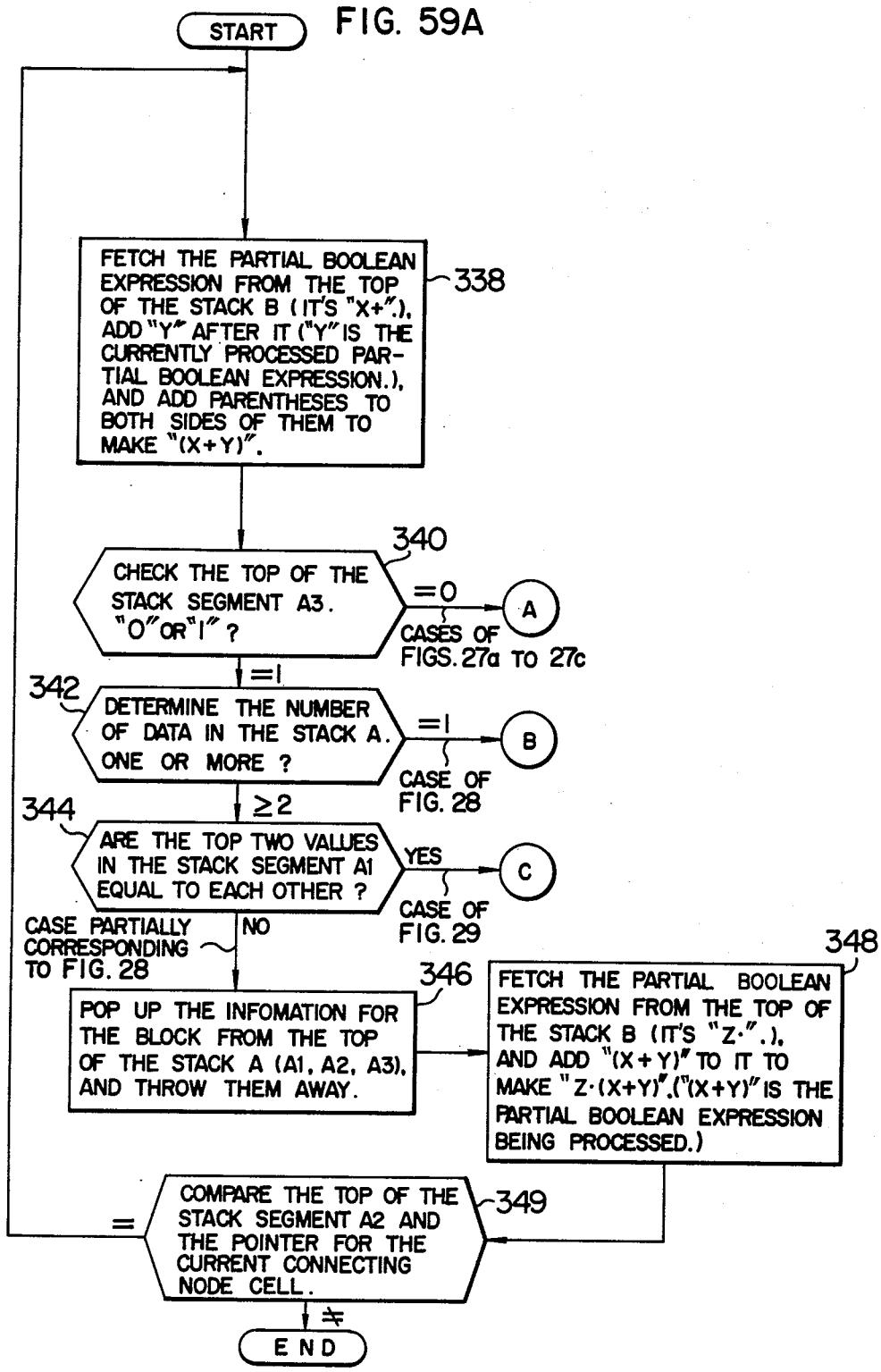
Figure 59B:
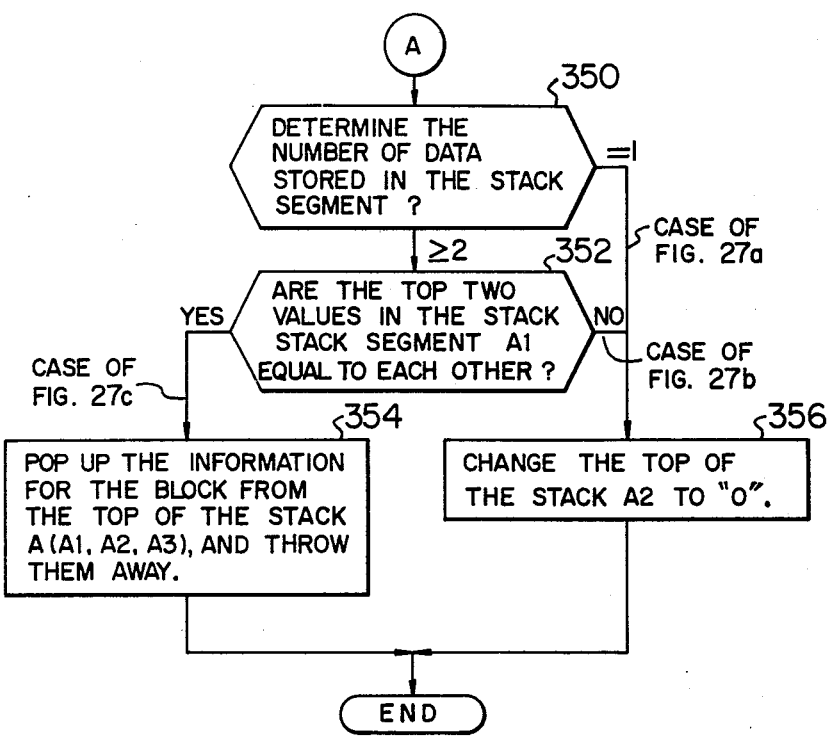
Figure 59C:
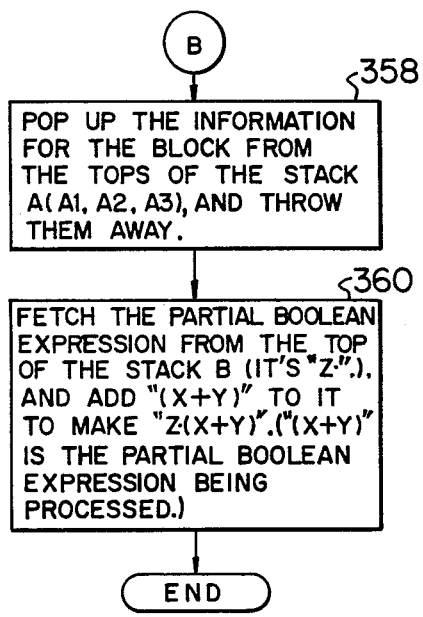

When the leading bit of the stack segment A3 is not "0" (FIG. 59A, step 340), the above process is not carried out but the number of data in the stack A is determined (FIG. 59A, step 342). If it is one, that is, if only the information of the block to which the completion process has been initially carried out is stored, it is determined that the condition of FIG. 28 is met. In this case, the content of the stack A is popped up (FIG. 59c, step 358), and the top of the stack B (which is "Z·" and which is to contain only this) is combined with the current partial Boolean expression "(X+Y)" to result at step 360 of FIG. 59c in "Z·(X+Y)". This completes the process of FIG. 28.

When the number of data in the stack A is two or more, the leading two values of the stack segment A1 are compared (FIG. 59A, step 344). If they are equal, it is determined that the branching node cell of the block to which the completion process has been carried out is the same as that of the block outside of the first-mentioned block. Since it has already been determined that the leading bit of the stack segment A3 is "1", that is, the process is for the lowermost branch cell of the branching node cell of the block, it is determined that the condition of FIG. 29 instead of FIG. 27c is met.

Figure 59D:
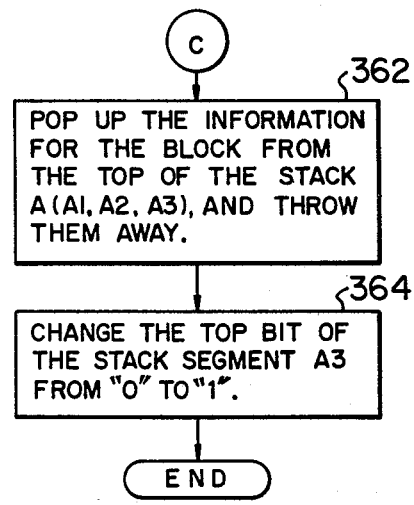

When the block to which the completion process has been carried out is viewed as a single branch cell, it is the lowermost branch cell of the branching node cell of the outside block. Thus, the process required is to pop up the data of the block in the stack A (FIG. 59D, step 362), to which the completion process has been carried out, and change the leading bit of the stack segment A3 from "0" to "1" (FIG. 59D, step 364). This completes the process for the case of FIG. 29.

When any of the conditions mentioned above is not met, it is determined that the connection partially corresponds to the condition of FIG. 28. In this case, a similar process to that for the case of FIG. 28 described above is carried out, that is, the top of the stack A are popped up (FIG. 59A, step 346) and the top of the stack B "Z·" are combined with the current partial Boolean expression "(X+Y)" to result at step 348 of FIG. 59A in "Z·(X+Y)".

Then, the value of the top of the stack segment A2 is compared with the value of the pointer for the current connecting node cell (FIG. 59A, step 349), and if they are equal, the process goes back to the starting point of the process (step 338) for the case of FIG. 22d to repeat the same process for a new block. This corresponds to the case where the block to be completed is duplex or multiplex as shown in FIG. 26.

The indication of the processing operations of the left chain processing circuit 41 have thus been described. The completion of the process for the left chain is then supplied to the right chain processing circuit 40, which in turn, restarts the process for the right chain (FIG. 56, step 296).

The details of the configuration and the processing operation of the Boolean expression converting unit 22 shown in FIG. 9 have thus been described.

Examples of processing operations by the Boolean expression converting unit 22 are shown in FIGS. 30a to 30c, in which FIG. 30a shows the connection of a relay ladder diagram before conversion, FIG. 30b shows a conversion process and FIG. 30c shows a result of such conversion. A symbol "$" shown in FIG. 30b represents a nucleus of a partial Boolean expression which is temperarily provided to allow an initial step of the conversion process to be carried out in the same manner as an intermediate step. It is put away after the conversion process has been completed. In FIG. 30b, the leftmost ends are the leading positions of the stacks A and B, and $P_A$ and $P_B$ represent stack pointers for the stacks A and B, respectively.

Figure 31:
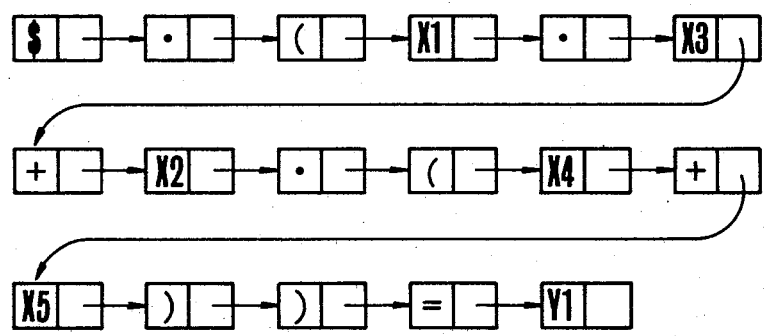

As is partially seen from the example of conversion process shown in FIG. 30b, when the ladder diagram to be converted is complex, it is necessary to load or unload the partial Boolean expression, which gradually becomes longer as the conversion process proceeds, in or from the stack B. This requires troublesome steps in the actual process. In the present invention, once the partial Boolean expression is generated and stored at a location in the Boolean expression memory 15, it is not moved therefrom, and instead of loading and unloading the actual partial Boolean expression in and from the stack B, the pointers for the first and last elements of the partial Boolean expression are loaded and unloaded. As a result, the number of processing steps for the stack B is always kept constant, that is, it is kept unchanged even if the partial Boolean expression becomes longer. Furthermore, in the present invention, the partial Boolean expression per se is in the form of a structure using pointers, that is, a list structure coupled by pointer chains. As a result, the actual partial Boolean expression need not be moved but only the pointers need be processed. FIG. 31 shows an example thereof, in which the example of FIG. 30 is represented in the form of list structure.

In this instance, a complete Boolean expression can be generated by the conversion in a logical sense but, in certain cases, it may be necessary to convert it to character representation. Since the Boolean expression shown in FIG. 31 which resulted from the conversion is of list structure coupled by a single chain, it can be readily converted to the character representation if one traces the list structure starting from the leading position. Furthermore, machine words of the SC can be derived from the Boolean expression of FIG. 31.

Figure 32:
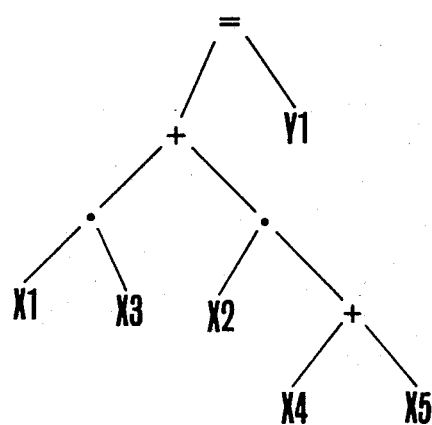

As described above, it is also possible to omit the intermediate conversion to the Boolean expression and directly convert the ladder diagram to the machine instructions of the SC. That is, in the conversion step from the ladder diagram, partial sequences of the machine instructions of the SC may be sequentially generated instead of generating the partial Boolean expressions. Alternatively, as is done in the high level machine language compiler, a tree structure as shown in FIG. 32 may be prepared in place of the partial Boolean expressions described above and a completed tree structure is converted to the machine instruction sequence of the SC.

In the explanation for the two conversion processes described above, that is, the conversion from the ladder diagram to the connection data and the conversion from the connection data to the Boolean expression, it was assumed that the initially applied ladder diagram was valid. However, since the ladder diagram which is source data for the conversion is described on a CRT screen by a human operator, it is accompanied by errors in many cases. Thus, by providing check points at key points in the conversion process, the input errors can be detected.

As an example, if the inputted ladder diagram includes an unterminated branch, the error can be detected by the connection extracting unit, as described above. This corresponds to the case of FIG. 14f as explained before.

Referring to a ladder diagram shown in FIG. 33a, it is valid and can function normally when it is viewed as a relay circuit. However, a Boolean expression which performs an equivalent function to that of the ladder diagram can be generated (see FIG. 33c) but a Boolean expression which directly corresponds to the ladder diagram does not exist. Accordingly, no machine instruction sequence of the SC therefor also exists. Since most of such ladder diagrams are due to input errors of the operator, it is advisable to detect those as input errors rather than converting them to only functionally equivalent Boolean expressions.

In the ladder diagram shown in FIG. 33a, the block consisting of a pair comprising a branching node cell and a connecting node cell does not have a nesting structure. In order for the ladder diagram to be convertable to a Boolean expression, a portion of the ladder diagram corresponding to the portion of the Boolean expression bracketed by a pair of brackets, that is a multiplex block enclosed by a pair comprising a branching node cell and a conecting node cell, should make a nesting structure in which a larger one or outer one sequentially encompasses a smaller one or inner one, as is the case of the Boolean expression.

The error in FIG. 33a can be detected, in the process by the Boolean expression converting unit, by checking any discrepancy between the content of the stack A and the corresponding connection of the node cell and the branch cell, at key points of the process. The ladder diagram of FIG. 33a can be expressed by the connection diagram of FIG. 33b. Now, consider a case where a connecting node cell N3 is to be processed after a branching node cell N2 has been processed. Since a branch cell X4 is the uppermost branch cell of the branching node cell N2, the block start process is carried out for the branching node cell N2. Thus, a pointer for the branching node cell N2 is stored in the stack segment A1 and "0's" are stored in the stack segments A2 and A3. Noting now the connecting node cell N3, since the branch cell X4 is the lowermost branch cell of the connecting node cell N3, the block completion process is needed. A block to which the completion process is to be carried out should have already be defined, and the pointer for that connecting node cell should have been stored in the stack segment A2 in the previous process step. However, the top of the stack segment A2 is "0", as described above. It is thus seen that the status described above can be detected by comparing the value of the top of the stack segment A2 with the pointer for the connecting node cell when the lowermost branch cell of the connecting node cell is processed.

This is a mere example, and the structural error can be detected in the similar way by checking the leading bits of the stack A and the corresponding connection of the node cell and the branch cell when the connecting node cell is processed.

The ladder diagram converting unit 14 has thus been described. The generated Boolean expression is then converted to the machine instructions of the SC by the machine instruction converting unit 16 and stored in the storage unit 2 of the SC in the form of machine instruction sequence program.

The ladder diagram reproducing unit 18 shown in FIG. 8 will now be described.

Figure 34:
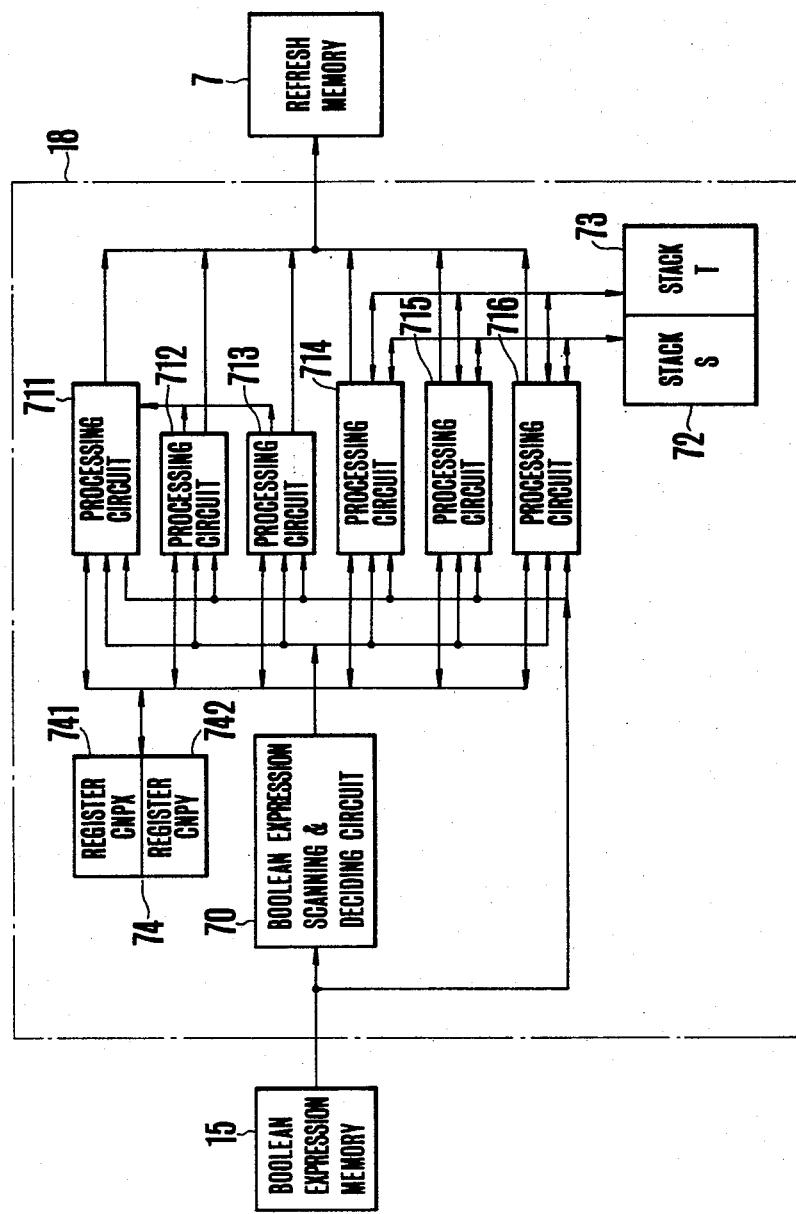

FIG. 34 shows a configuration thereof, in which numeral 70 denotes a Boolean expression scanning and deciding circuit, which sequentially scans the data representing the Boolean expressions stored in the Boolean expression memory 15, from the leading end thereof, and commands the execution of necessary operations to corresponding ones of processing circuits 711 to 716 in response to the symbol elements of the Boolean expression read out (e.g. "(", "+" or ")"). Numeral 72 and 73 denote stacked temporary memories, which are hereinafter referred to as stack S and stack T, respectively.

The stack S serves to temporarily buffer for the information of the portion (or block as described before) of the ladder diagram corresponding to the portion of the Boolean expression bracketed by a pair of brackets ("(" and ")"). More particularly, it retains coordinates of the portions corresponding to four surrounding edges of a block in the ladder diagram. The stack S is divided into four stack segments as shown in FIG. 35, a stack segment STY for storing a Y coordinate of the top edge of the block, a stack segment SBY for storing a Y coordinate of the bottom edge, a stack segment SLX for storing an X coordinate of the left edge and a stack segment SRX for storing an X coordinate of the right edge. The stack T retains the coordinates of the rightmost points of all horizontal branches in the block of the ladder diagram.

It is assumed that the following coordinate system is assigned to the CRT screen for displaying the reproduced output.

The uppermost-leftmost corner of the CRT screen is the origin and a coordinate is assigned to each crosspoint. Horizontal direction is represented by the X-axis and vertical direction is represented by the Y-axis, with the X-axis coordinate ascending from the left to the right and the Y-axis coordinate ascending from the top to the bottom.

Numeral 74 in FIG. 34 denotes a register for retaining the coordinates of the crosspoint being processed. It is referred to as CNP. Numerals 741 and 742 denote segments thereof which retain the X coordinate and the Y coordinate, respectively, of the coodinates stored in the CNP. They are referred to as CNPX and CNPY, respectively. A branch extending rightward from the crosspoint is also indicated by the same CNP.

Figure 60:
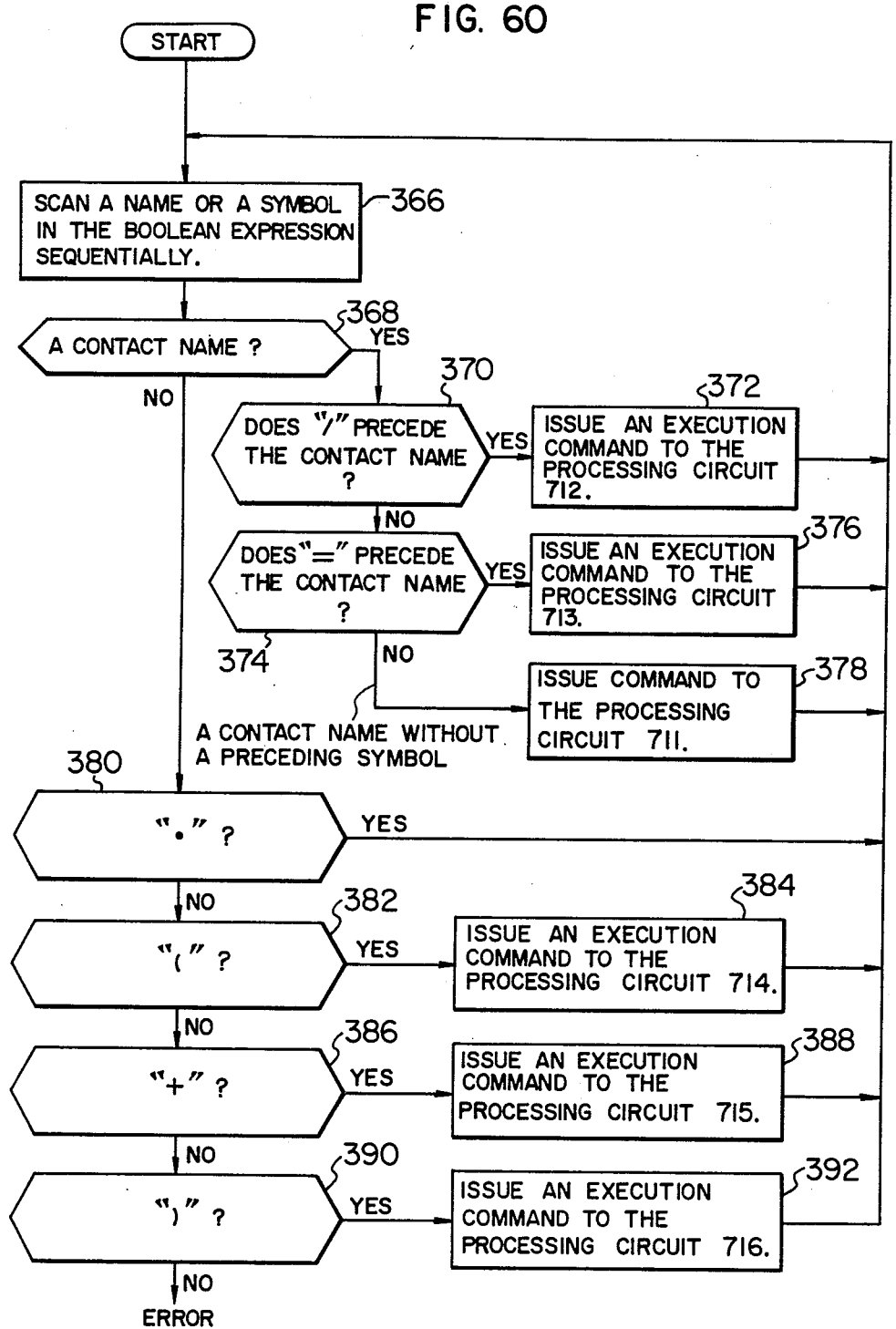
FIG. 60 is a flow chart illustrating the operation of the Boolean expression scanning and deciding circuit 70 of FIG. 34.
Figure 61:
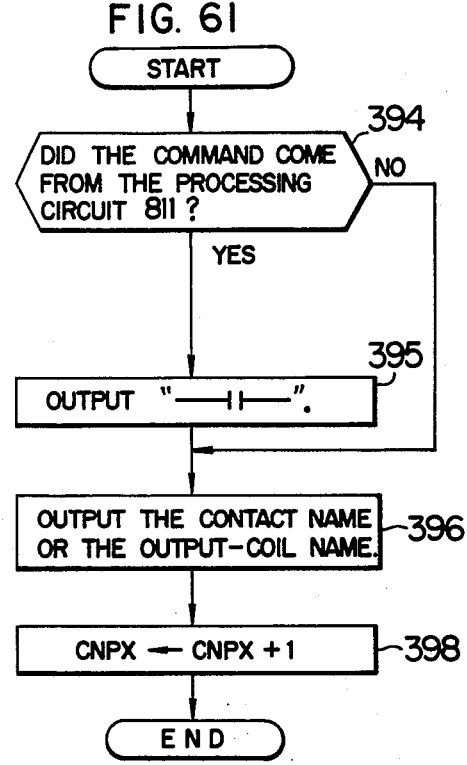
Figure 62:
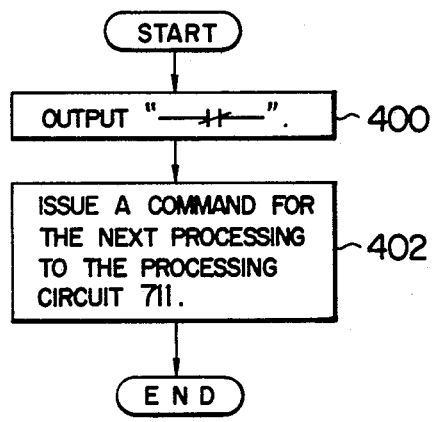
Figure 63:
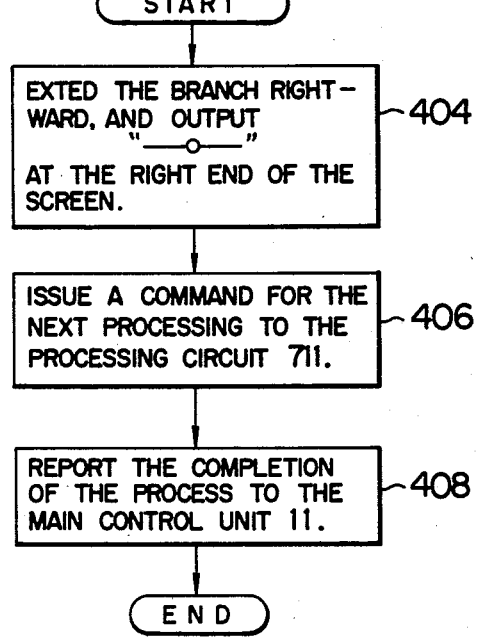

The Boolean expression scanning and deciding circuit 70 sequentially scans the Boolean expression memory 15 and commands the execution of necessary operations to corresponding ones of the processing circuits 711 to 716 in response to the symbol elements scanned out. The process is now explained by item:

The Boolean expression is sequentially scanned from the left to the right (FIG. 60, step 366), and (1) if a name of a contact is found (FIG. 60, step 368);
  (i) if there is no symbol in front of the name of the contact (step 370, 374), an execution command is issued to the processing circuit 711 (step 378) and the name of the contact and a contact pattern ( ) are produced at the position specified by CNP by the processing circuit 711. That is, the processing circuit 711 detects the sources of commands provided thereto (FIG. 61, step 394), and if it is from the processing circuit 711, the contact pattern is generated (FIG. 61, step 395) and then the name of the contact is generated (FIG. 61, step 396), but (ii)
  (a) if a logical NOT symbol "/" is included in front of the name of the contact (FIG. 60, step 370), an execution command is issued to the processing circuit 712 (step 372) and a symbol "   " is produced (FIG. 62, step 400) by the processing circuit 712. The name of the contact is again generated by the processing circuit 711. So, the processing circuit 712 issues a command thereto (FIG. 62, step 402) and the processing circuit 712 responds to this command from the circuit 712 (FIG. 61, step 394) and skips the step 395 to generate only the name of the contact (FIG. 61, step 396), but (b) if a substitution symbol "=" is included in front of the name of the contact (FIG. 60, step 374), an execution command is issued to the processing circuit 713 (FIG. 60, step 376) and a branch is extended from the position specified by the CNP and a symbol "   " is produced at the right end (FIG. 63, step 404). The name of the contact is generated by the processing circuit 711 as described previously (FIG. 61, step 396). Thus, the processing circuit 713 issues an execution command thereto (FIG. 63, step 406) This completes the process for one Boolean expression when the symbol "=" was found. The indication of the completion of the process is supplied to the main control unit 11 (FIG. 63, step 408) by the processing circuit 713.

(iii) The content of the CNPX is incremented by one (FIG. 61, step 398) by the processing circuit 711 in any of the cases above.

(2) If a logical AND symbol "·" is found (FIG. 60, step 380), no process is required and the step proceeds to the next one.

(3) If a bracket symbol "(" is found indicating the start of a new block (FIG. 60, step 382), an execution command is issued to the processing circuit 714 (FIG. 60, step 384) and (i) the content of the CNPX is loaded into the stack segments SLX and SRX, and the content of the CNPY is loaded into the stack segments STY and SBY (FIG. 64, step 410), and (ii) a delimiter symbol (e.g. the value which is never found in the process) is loaded into the stack T (FIG. 64, step 412) (by the processing circuit 714).

(4) If a logical OR symbol "+" is found (FIG. 60, step 386), an execution command is issued to the processing circuit 715 (FIG. 60, step 388) and (i) the leading bits of the stack segment SRX are compared with the content of the CNPX and the larger one is written into the SRX (FIG. 65, step 414) (the update of the right end of the block), (ii) the content of the CNP (CNPX and CNPY) is loaded into the stack T (FIG. 65, step 416).

(iii) the top of the stack segment SLX is loaded into the CNPX (FIG. 65, step 418) (with the top of the stack segment SLX being unchanged), (iv) the value of the top of the stack segment SBY is fetched and incremented by one, the result being loaded into the CNPY and also written into the stack segment SBY (FIG. 65, step 420) by the processing circuit 715.

(5) If a bracket symbol ")" is found indicating the end of the block (FIG. 60, step 390), an execution command is issued to the processing circuit 316 (FIG. 60, step 392) and (i) the value of the top of the stack segment SRX is compared with the content of the CNPX to determine which one is larger (FIG. 66, step 422), (ii) the larger one determined in (i) indicates an X coordinate of the right end of the longest branch in the horizontal branches included in the block. On the other hand, the coordinates of the right ends of the horizontal lines are all stored in the stack T. Thus, for the shorter branches, the horizontal lines ( ) are extended from the respective right ends based on the coordinates stored in the stack T to normalize the length of the respective horizontal lines (step 424).

(iii) The values of the top of the stack segments SLX, SRX, STY and SBY are fetched and, based on them, the left end and the right end of the block are connected with vertical lines. For the lowermost Y-coordinate, the content of the CNPY is used instead of the value of the top of the SBY (step 426).

(iv) If the stack S (SLX, SRX, STY, SBY) is not vacant (step 428), the value of the top of the stack segment SBY is compared with the content of the CNPY (the lowermost Y coordinate of the block), and the larger one is written back to the stack segment SBY (step 430).

(v) The larger value determined in (i) is loaded into the CNPX and the value which has been stored at the top of the STY up to the step (iii) is loaded into the CNPY (step 432) by the processing circuit 716.

The ladder diagram is constructed from the original point. The CNP is initially set to the original point. The power bus and the ground line on the opposite ends of the screen may be drawn either before or after this process.

FIGS. 36a to 36c show an example of the conversion process, in which FIG. 36a shows a Boolean expression to be converted, FIG. 36b shows the conversion step and FIG. 36c shows the result of the conversion. FIG. 37 shows the ladder diagram being constructed in the process of the conversion. The numbers given to respective drawings in FIG. 37 correspond to the numbers in the conversion steps of FIG. 36b. In FIG. 36b, $P_S$ and $P_T$ represent stack pointers for the stacks S and T, respectively. A symbol "#" shown in the stack T represents a delimiter symbol. The leftmost ends of the stacks S and T are leading positions of the stacks.

In the present embodiment of the ladder diagram reproducing unit, the ladder diagram is produced such that the respective contact patterns are biased to the upper and left sides. Other forms of ladder diagram such as a rightward biased diagram can be produced by changing the process for the symbols "(", "+" and ")".

Since the display screen on which the ladder diagram is developed and displayed is usually definite, it is necessary to check any error condition which causes the display to exceed the display area. This may be accomplished by checking if the contents of the CNPX and CNPY exceed predetermined limits when they are incremented.

The validity check for the Boolean expression is also necessary. This may be accomplished by checking the sequence of the Boolean expression symbols and the numbers of lefthand and righthand brackets.

When the program written into the memory of the SC is always one that is inputted by the program inputting device in accordance with the present invention, the error check therefor has been completed when it was written into the memory of the SC, through the conversion process from the ladder diagram. Accordingly, the error check described above is not necessary when such a program is fetched from the memory of the SC to reproduce the ladder diagram.

In the Boolean expression, if the last executed operation is a logical OR operation, the opposite ends of the expression are not usually enclosed by the brackets "(" and ")" (see FIG. 38a), but in the present algorithm it is necessary to enclose the opposite ends of the logical OR operation term by a pair of brackets "(" and ")" (see FIG. 38b). The expression as shown in FIG. 38a can be readily converted to the expression shown in FIG. 38b, or such a conversion may be omitted if a similar procedure is taken whenever a symbol "+" appears.

A similar problem may occur in the conversion process from the ladder diagram to the Boolean expression. When a ladder diagram as shown in FIG. 38c is given, the Boolean expression as shown in FIG. 38b is derived. In such a case, the outermost brackets may be readily eliminated.

As described hereinabove, by the use of the sequence program inputting device of the present invention, the sequence program can be produced, corrected and edited in the form of ladder diagram on the display screen without being restricted by the sequence of the machine instructions of the SC.

The sequence program inputting device of the present invention can also find its use in printing out the content of the memory of the SC in the form of a ladder diagram as well as displaying it on the CRT display, or converting the data read out by a pattern recognition device in the form of ladder diagram to the machine instruction sequence of the SC.

What we claim is:

1. A sequence program inputting device for providing a machine instruction sequence for executing controls defined by a ladder diagram to a sequence controller which provides control output signals in response to said machine instruction sequence, wherein said ladder diagram comprises a plurality of device symbols, line symbols for connecting said device symbols and reference symbols for indicating references of said device symbols, comprising:

first means for individually manually specifying said device symbols, said line symbols and said reference symbols;

second means for displaying patterns including a refresh memory which stores pattern codes for specifying patterns to be displayed at respective display positions;

third means for generating pattern codes for displaying said specified symbols and for storing said generated pattern codes in said refresh memory at storing positions thereof corresponding to display positions of said specified symbols, thereby allowing said second means to display said ladder diagram, wheren said third means further includes means for generating said machine instruction sequence by decoding said pattern codes stored in said refresh memory after said ladder diagram is displayed by said second means.

2. A sequence program inputting device of claim 1, wherein said first means includes means for specifying said symbols by separately indicating which symbol is selected and to which position within said ladder diagram said selected symbol belongs.

3. A sequence program inputting device of claim 2, wherein said second means includes a cathode ray tube for displaying said patterns and means for generating a cursor on a display screen thereof, and said first means includes a plurality of keys for indicating which symbol is selected and means for moving said cursor position in order to indicate said position of said selected symbol by said cursor position.

4. A sequence program inputting device according to claims 1, 2 or 3, wherein said third means includes means for generating said machine instruction sequence by generating data in the form of a Boolean expression in terms of said references as a result of decoding of said pattern codes and by converting said data into said machine instruction sequence.

5. A sequence program inputting device of claim 4, wherein the generating means of said third means operates to generate said data in a form of Boolean expression by extracting logical connection data of said ladder diagram as a result of decoding of said pattern codes and by converting said logical connection data into said data in a form of Boolean expression.

6. A sequence program inputting device of claim 1, further comprising:
fourth means for receiving a machine instruction sequence from said sequence controller, and
fifth means for generating pattern codes to be stored in said refresh memory so that said second means displays a ladder diagram corresponding to said received machine instruction sequence.

7. A sequence program inputting device of claim 1, wherein said second means includes a refresh memory which substantially stores said symbol codes and position signals by storing said symbol codes at positions corresponding to said position signals of said respective symbols, and said third means includes means for displaying said symbols in response to said symbol codes at display positions thereof corresponding to storing positions of said respective symbol codes within said refresh memory.

8. A sequence program inputting device for providing a machine instruction sequence for executing controls defined by a ladder diagram to a sequence controller which provides control output signals in response to said machine instruction sequence, wherein said ladder diagram comprises a plurality of device symbols, line symbols for connecting said device symbols and reference symbols for indicating references of said device symbols, comprising:
first means for manually specifying one of said device symbols, said line symbols and said reference symbols to generate a symbol code and a position signal of said specified symbol;
second means for storing said symbol codes and position signals each for said specified symbol;
third means for displaying symbol patterns in response to said stored symbol codes and at display positions corresponding to said position signals of said respective symbols, thereby displaying said display diagram;
fourth means for generating said machine instruction sequence by decoding said symbol codes and position signals stored in said second means.

* * * * *